United States Patent
Rimchala et al.

(10) Patent No.: US 11,720,605 B1
(45) Date of Patent: Aug. 8, 2023

(54) TEXT FEATURE GUIDED VISUAL BASED DOCUMENT CLASSIFIER

(71) Applicant: Intuit Inc., Mountain View, CA (US)

(72) Inventors: Tharathorn Rimchala, San Francisco, CA (US); Yingxin Wang, Newark, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/876,069

(22) Filed: Jul. 28, 2022

(51) Int. Cl.
*G06F 16/28* (2019.01)
*G06V 30/14* (2022.01)
*G06F 16/93* (2019.01)
*G06F 16/2457* (2019.01)

(52) U.S. Cl.
CPC ...... *G06F 16/287* (2019.01); *G06F 16/24578* (2019.01); *G06F 16/93* (2019.01); *G06V 30/1444* (2022.01)

(58) Field of Classification Search
CPC ... G06N 3/0454; G06N 20/00; G06F 16/2457
See application file for complete search history.

(56) References Cited

U.S. PATENT DOCUMENTS

| | | | | |
|---|---|---|---|---|
| 2021/0241331 | A1* | 8/2021 | Katzenelson | G06F 40/216 |
| 2021/0271872 | A1* | 9/2021 | Gupta | G06N 3/045 |
| 2021/0350516 | A1* | 11/2021 | Tang | G06F 16/93 |
| 2021/0406533 | A1* | 12/2021 | Arroyo | G06F 16/5846 |

OTHER PUBLICATIONS

Kim et al., "OCR-free Document Understanding Transformer," arXiv:2111.15664v1 [cs.LG] Nov. 30, 2021, https://arxiv.org/abs/2111.15664, (Year: 2021).

"Li et al., TrOCR: Transformer-based Optical Character Recognition with Pre-trained Models," arXiv:201910282v3 [cs.CL] Sep. 25, 2021, https://arxiv.org/abs/2109.10282, (Year 2021).

* cited by examiner

*Primary Examiner* — Hau H Hoang
(74) *Attorney, Agent, or Firm* — Paradice & Li LLP

(57) ABSTRACT

A visual-based classification model influenced by text features as a result of the outputs of a text-based classification model is disclosed. A system receives one or more documents to be classified based on one or more visual features and provides the one or more documents to a student classification model, which is a visual-based classification model. The system also classifies, by the student classification model, the one or more documents into one or more document types based on one or more visual features. The one or more visual features are generated by the student classification model that is trained based on important text identified by a teacher classification model for the one or more document types, with the teacher classification model being a text-based classification model. Generating training data and training the student classification model based on the training data are also described.

20 Claims, 9 Drawing Sheets

Receive a plurality of documents to be classified by a text-based teacher classification model into one or more document types. 802

For each of the plurality of documents, receive a plurality of terms included in the document, wherein the terms are based on OCR performed on the document. 804

Identify one or more terms of the plurality of terms as key identifying terms for a document type based on occurrences of the one or more terms relative to occurrences of other terms in the plurality of terms in the plurality of documents. 806

For each of the plurality of terms, generate a statistical measurement for the term indicating the relative occurrence of the term for a document type. 808

Generate a relative importance measurement for each of the plurality of terms based on the statistical measurements and the document type, wherein the relative importance measurement indicates an importance of the term with reference to other terms in the plurality of terms. 810

Rank the plurality of terms based on the relative importance measurement. 812

Identify the key identifying terms for the document type based on the ranking. 814

Identify, for each document, the key identifying terms in the document. 816

Generate, for each document, one or more prediction targets in the document based on the locations of the key identifying terms in the document. 818

Generate the training data to train a student classification model, wherein the training data is based on the one or more prediction targets. 820

Figure 8

TEXT FEATURE GUIDED VISUAL BASED DOCUMENT CLASSIFIER

TECHNICAL FIELD

This disclosure relates generally to visual based document classifiers, including a visual based document classifier that is text feature influenced by a text based classifier.

DESCRIPTION OF RELATED ART

Document classification may be used to catalog a large corpus of documents, with a document classification to be used to identify user information needed for a specific document or perform a variety of other functions for the specific document based on the document classification. For example, a plurality of university documents may be classified into different types of documents for different departments, such as specific classes, specific areas of study (e.g., social sciences, hard sciences, etc.), and so on. Typically, an individual or team of individuals would classify each document manually based on the individual's knowledge of the documents and the categories to which a document may be classified. Manually classifying documents is a labor intensive process that may take an unusually large team of people and amount of time, especially as the corpus of documents to be classified grows.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for classifying documents. The method includes receiving one or more documents to be classified based on one or more visual features. The method also includes providing the one or more documents to a student classification model, with the student classification model being a visual-based classification model. The method further includes classifying, by the student classification model, the one or more documents into one or more document types based on the one or more visual features. The one or more visual features are to be used by the student classification model to classify the one or more documents into the one or more document types, and the one or more visual features are generated by the student classification model that is trained based on important text identified by a teacher classification model for the one or more document types from a plurality of documents, with the teacher classification model being a text-based classification model. For example, the visual-based student classification model may be trained to classify documents into one or more document types through the auxiliary task of predicting one or more visual regions, with the one or more visual regions corresponding to important text as identified by a text-based teacher classification model for the one or more document types.

Another innovative aspect of the subject matter described in this disclosure can be implemented in a system for classifying documents. An example system includes one or more processors and a memory storing instructions that, when executed by the one or more processors, cause the system to perform operations. The operations include receiving one or more documents to be classified based on one or more visual features. The operations also include providing the one or more documents to a student classification model, with the student classification model being a visual-based classification model. The operations further include classifying, by the student classification model, the one or more documents into one or more document types based on the one or more visual features. The one or more visual features are to be used by the student classification model to classify the one or more documents into the one or more document types. In addition, the one or more visual features are generated by the student classification model that is also trained to predict the region containing the important text identified by a teacher classification model for the one or more document types from a plurality of documents, with the teacher classification model being a text-based classification model. For example, the visual-based student classification model may be trained to classify documents into one or more document types through the use of the one or more visual regions and to detect the one or more visual regions corresponding to important text as identified by a text-based teacher classification model for the one or more document types.

Another innovative aspect of the subject matter described in this disclosure can be implemented as a computer-implemented method for generating, by a text-based teacher classification model, text based information used in generating training data to train a visual-based student classification model. The method includes receiving a plurality of documents to be classified by a teacher classification model into one or more document types. The method also includes receiving, for each of the plurality of documents, a plurality of terms associated with the document, with the plurality of terms being based on optical character recognition (OCR) performed on the document. The method further includes generating, for each of the plurality of terms, a statistical measurement associated with an occurrence of the term for the document type. The method further includes identifying one or more terms of the plurality of terms as key identifying terms for a document type based on the statistical measurements. Identifying the one or more terms of the plurality of terms as key identifying terms for the document type includes generating a relative importance measurement for each of the plurality of terms based on the statistical measurements. The relative importance measurement indicates an influence of the term with reference to other terms in the plurality of terms in a decision boundary used by the teacher classification model. Identifying the one or more terms of the plurality of terms also includes ranking the plurality of terms based on the relative importance measurement; and identifying the key identifying terms for the document type based on the ranking. The training data for training the student classification model may include one or more prediction targets generated for a document based on the key identifying terms (such as one or more bounding boxes and a mask associated with locations of the key identifying terms in a document provided to the student classification model).

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2 shows photographs of example documents with similar visual features.

FIG. 8 shows an illustrative flow chart depicting an example operation of a teacher classification model to generate training data for training the student classification model, according to some implementations.

Like numbers reference like elements throughout the drawings and specification.

DETAILED DESCRIPTION

Figure 1:
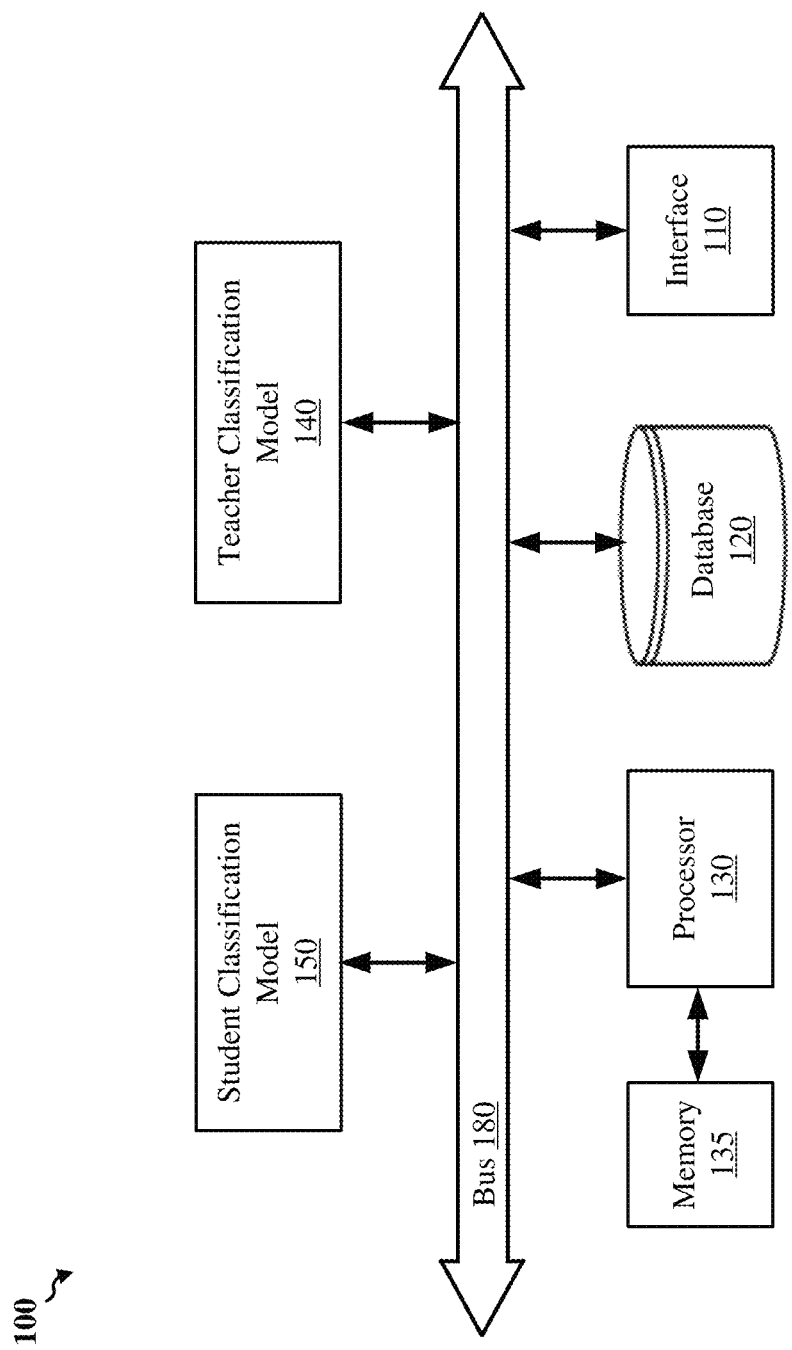
FIG. 1 shows an example system for classifying documents, according to some implementations.

Implementations of the subject matter described in this disclosure may be used for the classification of documents. In particular, systems and methods are described regarding the use of a visual-based classifier to classify a document in order to increase the inference speed and throughputs of classifying the document as compared to using a text-based classifier, but the visual-based classifier is influenced by text features indicated by a text-based classifier to improve the accuracy and reliability of the visual-based classifier, especially among visually similar documents that belong to different document types. To note, as used herein, "classification", "categorization", "document type", "document class", "classify", "categorize", and similar terms may be used interchangeably.

The use of automated classification models expedites the classification of documents as compared to manually classifying documents. Usability of the classification model outputs in a product relies on inference speed while the quality of the classification model is based on the accuracy of classification, with many times speed and accuracy being inversely related. Two types of classification models that depict the inverse relationship between accuracy and speed include text-based classification models and visual-based classification models. For text-based classification, optical character recognition (OCR) is performed on each document to generate computer readable text, and the text-based classification model categorizes the document based on the computer readable text. For visual-based classification, a visual-based classification model identifies visual artifacts in each document (such as lines, boxes, or other objects) based on pixel values of the document and categorizes the document based on the visual artifacts.

Text-based classification of documents including text is typically more accurate than visual-based classification of documents because the classification of documents including text may primarily depend on the text. However, performing OCR on the documents to be classified is time and processing intensive. In particular, a majority of the time and processing resources required for text-based classification is consumed by performing OCR on documents. Since visual-based classification does not require performing OCR on a document, visual-based classification is much faster than text-based classification of documents. Therefore, what is needed is an improved classification model that combines the speed of visual-based classification with the overall accuracy of text-based classification.

Various implementations of the subject matter disclosed herein provide one or more technical solutions to the technical problem of document classification. In particular, various implementations of the subject matter discloses a visual-based classification model trained using visual regions of documents, with the visual regions corresponding to important text as identified by a text-based classification model for one or more document types. In this manner, the visual-based classification model may use visual artifact identification techniques to identify specific visual artifacts in the visual regions associated with specific text as additional training objectives to classify documents. In some implementations, a computing system is configured to receive one or more documents to be classified and provide the one or more documents to a student classification model, which is a visual-based classification model. The system is also configured to classify, by the student classification model, the one or more documents into one or more document types based on the visual features derived from the documents. The visual based student classification model is trained to classify documents into one or more document types through the use of the one or more visual regions as prediction targets, with the one or more visual regions corresponding to important text as identified by a text based teacher classification model for the one or more document types. The teacher classification model is configured to generate the additional training targets used to train the student classification model. For example, key identifying terms for one or more document types are identified by the teacher classification model, and one or more visual regions of a document corresponding to the key identifying terms are identified as additional prediction targets to be used for training the visual based student classification model.

Various aspects of the present disclosure provide a unique computing solution to a unique computing problem that did not exist prior to document classification models (in particular, machine learning (ML) based models) implemented in computing systems. In addition, classifying hundreds or thousands, or even millions, of documents in time for product useability (such as in real-time) cannot be performed in the human mind, much less using pen and paper. As such, implementations of the subject matter disclosed herein are not an abstract idea such as organizing human activity or a mental process that can be performed in the human mind.

FIG. 1 shows an example system 100 for classifying documents, according to some implementations. The system 100 includes an interface 110, a database 120, a processor 130, a memory 135 coupled to the processor 130, a teacher classification model 140, and a student classification model 150. In some implementations, the various components of the system 100 may be interconnected by at least a data bus 180, as depicted in the example of FIG. 1. In other implementations, the various components of the system 100 may be interconnected using other suitable signal routing resources.

Figure 3:
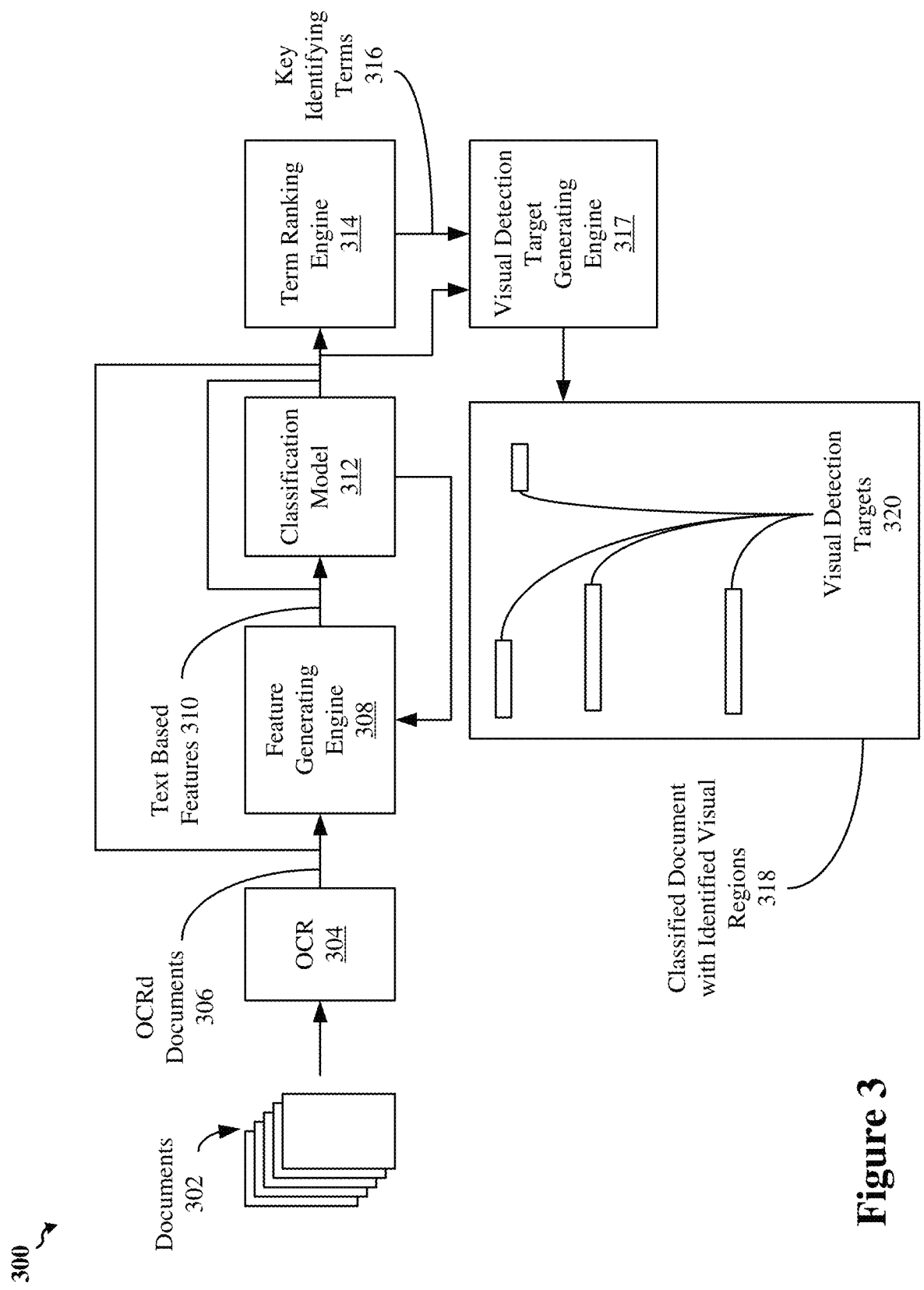
FIG. 3 shows an example of a teacher classification model, according to some implementations.
Figure 4:
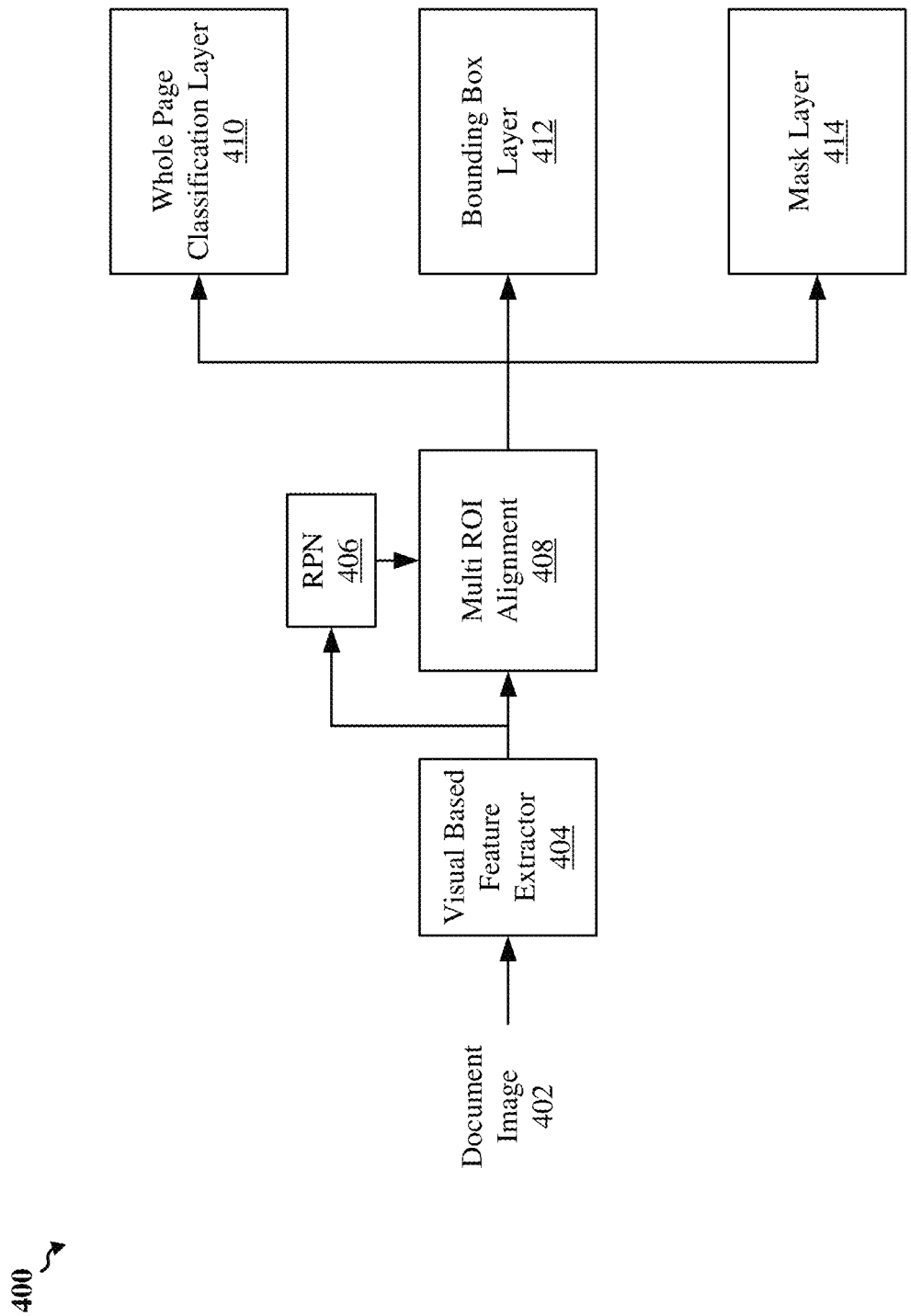
FIG. 4 shows an example of a student classification model for training, according to some implementations.
Figure 5:
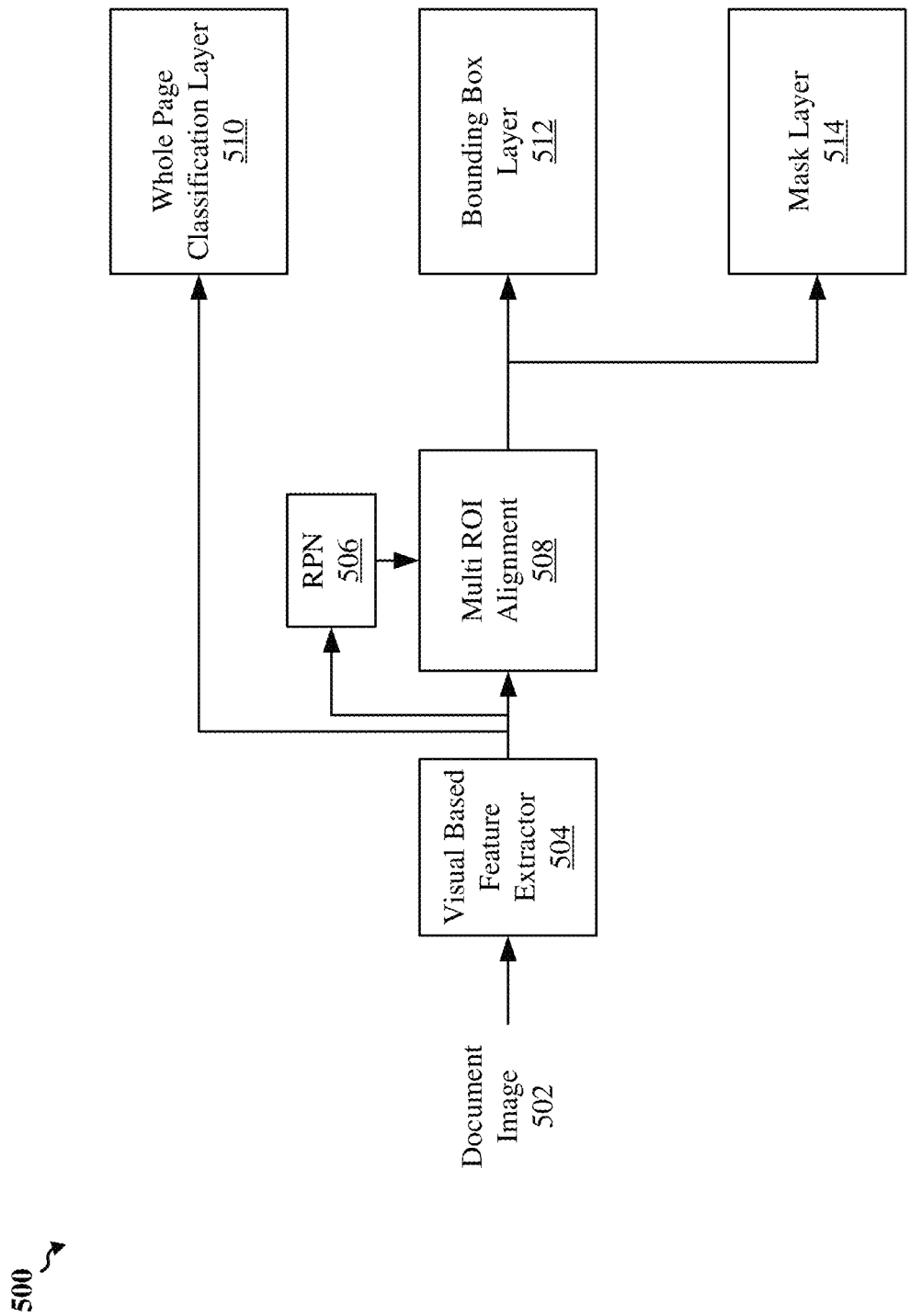
FIG. 5 shows another example of a student classification model for training, according to some implementations.
Figure 6:
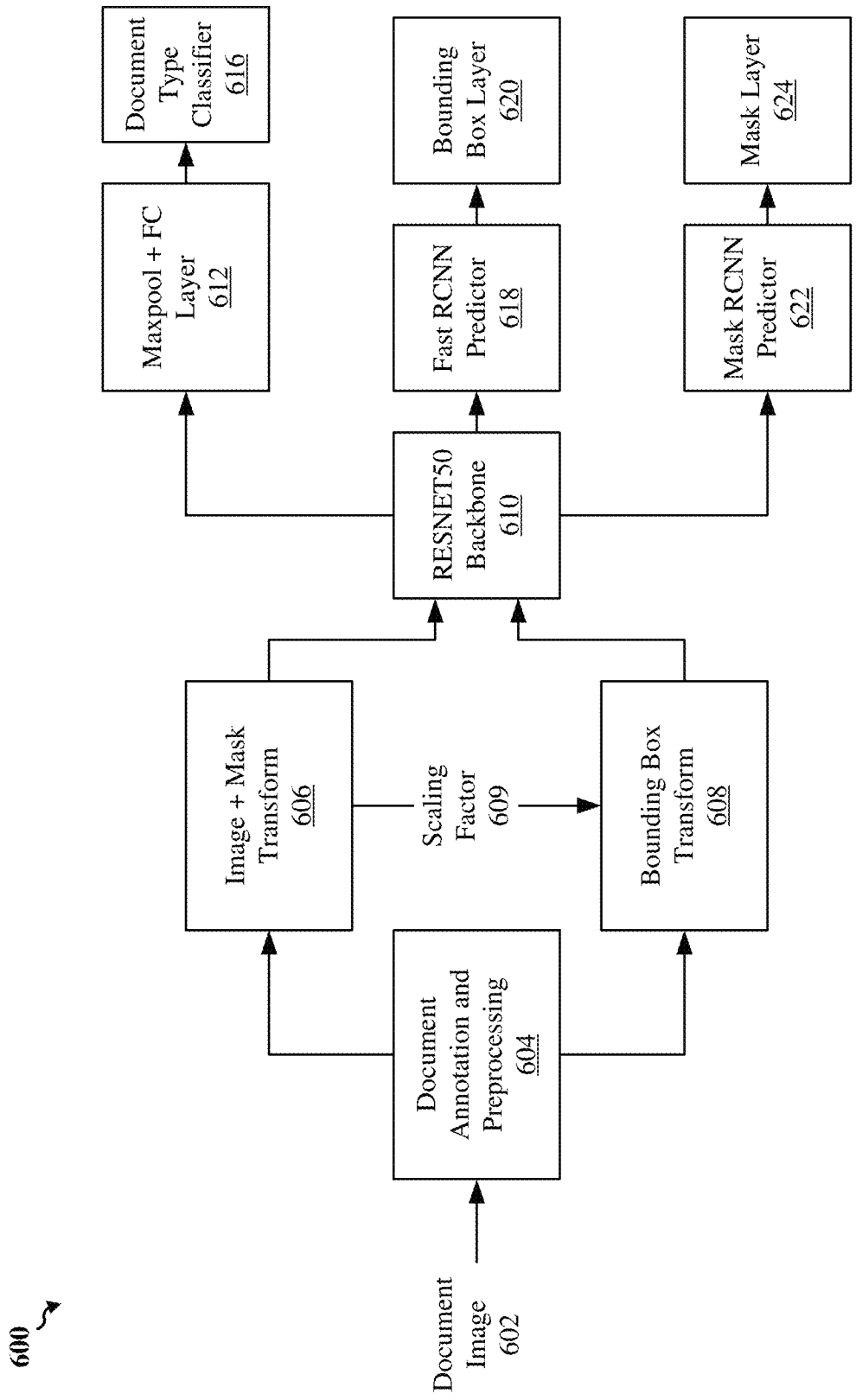
FIG. 6 shows a detailed implementation of an example training architecture for a student classification model, according to some implementations.

The teacher classification model 140 is a text-based classification model, which may include any suitable machine learning (ML) model for classifying documents into one or more document types based on text in the documents. The student classification model 150 is a visual-based classification model, which may include any suitable machine learning (ML) model for classifying documents into the one or more document types based on visual features in the documents. The teacher classification model 140 is configured to identify important text (such as key identifying terms) for the one or more document types, and the teacher classification model 140 is further configured to identify one or more visual regions of a document corresponding to the important text in the document, with the visual regions to be used as prediction targets to train the student classification model 150. In some implementations, the teacher classification model 140 generates a list of key identifying terms (which may be the most important words, tokens, bigrams, or other n-grams of text) associated with a document type that are used by the teacher classification model 140 to define visual regions of a document classified into the document type as prediction targets. The prediction targets are regions of interest (ROIs) used for training the visual based student classification model 150. In this manner, the teacher classification model 140 is configured to provide a "teaching signal" to the student classification model 150 in order to train the student classification model 150 to be attentive to the ROIs in a document based on text of importance in classifying the document, with the system 100 configured to train the student classification model 150 based on the "teaching signal" generated by the teacher classification model 140 in addition to the whole-page document types. Once the student classification model 150 is trained, the system 100 may be configured to use the trained student classification model 150 to classify one or more documents. FIG. 3 depicts an example implementation of a teacher classification model (such as the teacher classification model 140) for generating prediction targets in one or more documents, and FIGS. 4-6 depict example implementations of a student classification model (such as the student classification model 150) and training apparatus for training the student classification model based on the prediction targets. As used herein, training data may refer to the collections of the document images, with document types and the prediction targets or any other information generated by the teacher classification model 140 that is of use in training the student classification model 150. For example, a training set of (x, y_roi, y_doctype) for a document (with roi standing for "region of interest" and "doctype" standing for document type) may be associated with a visual-based student classification model training. x is the raw image (which is the visual input to a model), y_roi is a region of interest (ROI) associated with a bounding box of important words (which may include one or more ROIs or one or more bounding boxes (also referred to as BBoxes)), and y_doctype is a document type of the input document (which is the raw image x). The student classification model learns to predict both the y_roi and the y_doctype (which may be performed concurrently or simultaneously).

The interface 110 may be one or more input/output (I/O) interfaces to obtain documents for classification. For example, if a document is to be received locally to the system 100, the interface 110 may include a scanner, a camera, or other optical device that may be used to receive the documents. In another example, if a document is to be received from another device (such as a user device or a repository remote to the system 100), another device may have imported the document, with the document being transmitted to the system 100 via a wireless or wired connection. The interface 110 may also provide an indication of the generated classifications, masks associated with specific documents for classification, or other information associated with operation of the teacher classification model 140, the student classification model 150, or other components of the system 100. For example, if a user is local to the system 100, the system 100 may display an indication of a classification or other information generated by the student classification model 150. If a user is remote to the system 100, the system 100 may transmit the indication or other information to a user device for display or another device to use the information. As used herein, a user may refer to a developer, tester, supervisor, or other suitable entity attempting to train the student classification model 150 for later use in a product or otherwise to be able to classify documents into various document types.

An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from user devices (such as a user's personal computer) or other devices. In some implementations, the interface 110 may also include a display (which may include a touch sensitive display), a speaker, a mouse, a keyboard, or other suitable input or output elements that allow interfacing with a user.

The database 120 may store the documents obtained by the interface 110. The database 120 may also store outputs from the teacher classification model 140, outputs from the student classification model 150, and hyperparameters or other features associated with the trained teacher classification model 140 and the student classification model 150. The database 120 may further store computer executable instructions for operation of the system 100. In some implementations, the database 120 may include a relational database capable of presenting information (such as document classifications, salient text features associated with specific documents or specific classifications of documents, and so on) as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, the teacher classification model 140, the student classification model 150, or other components of the system 100 (such as for training the student classification model 150). The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the teacher classification model 140, the student classification model 150, or other components of the system 100. The memory 135 may also store the inputs to and the outputs from the teacher classification model 140 and the student classification model 150, which may be before or after processing by the processor 130. In some implementations, hardwired circuitry may be used in place of, or in combination with, software instructions to implement aspects of the disclosure. As such, implementations of the subject matter disclosed herein are not limited to any specific combination of hardware circuitry and/or software.

Figure 2:
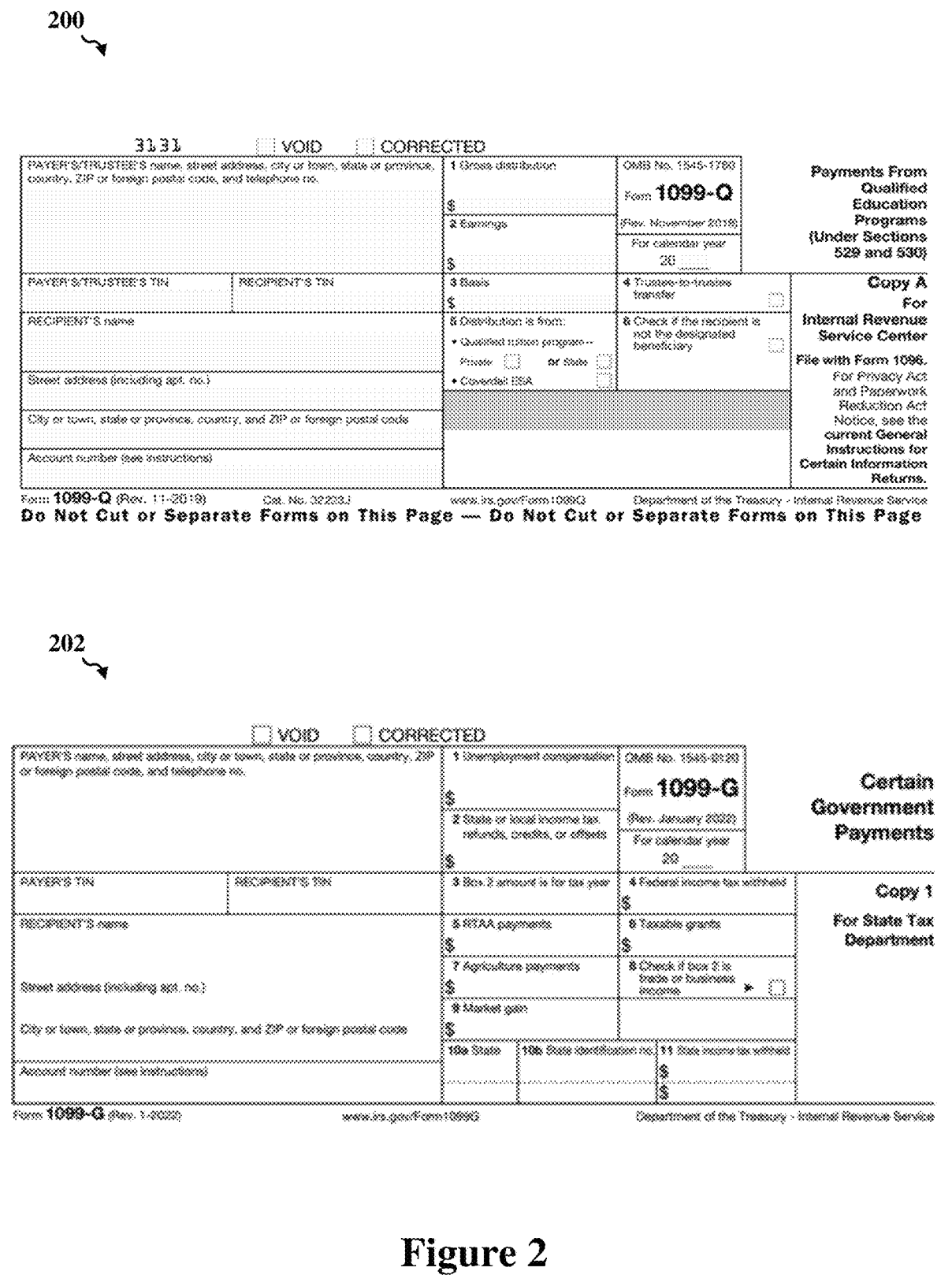

Many documents that are of different document types may appear visually similar (such as based on the lines and other objects in the documents being similar but the text or focus of the documents differing). For example, many different tax documents (such as those released by the Internal Revenue Service (IRS) or other taxation authorities) may appear similar if not reading the text of the documents. FIG. 2 shows photographs 200 and 202 of example documents with similar visual features. Photograph 200 is a photograph of a blank (also referred to as unfilled) 1099-Q form from the IRS (which is used by financial institutions to indicate payments from Qualified Education Plans), and photograph 202 is a photograph of a blank/unfilled 1099-G form from the IRS (which is used by a government agency to indicate funds received by an individual that may need to be reported). As can be seen in the photographs 200 and 202, boxes and other visual artifacts are similar between the two forms. As a result of the visual artifacts being similar, a visual-based classification model may classify the forms into a same document type even though the forms are to be classified into different document types.

Conversely, documents that belong to the same document types may look visually different and thus it may be challenging to train a pure visual based classification model to predict them correctly without any additional teaching signals from a text based classification model. For example, a 1040 tax return document from the IRS appears substantially different from a 540 California resident tax return document from the California Franchise Tax Board. However, the text between the tax return documents is similar, with both documents requesting the same information (such as name, address, specific income information, and so on). As such, it may be desired to classify the documents into the same document type based on the text (such as a classification of "personal tax return forms"), but a visual-based classification model may classify the documents into different classifications based on the documents appearing distinctly unalike from the document formatting.

As such, if the visual-based classification model is trained to identify visual artifacts based on specific text and ROIs associated with the specific text in addition to multi-class classification, the visual-based classification model may be able to more robustly classify documents that appear similar but belong to different document types and to more accurately classify documents that appear different but belong to the same document type. As described herein, the teacher classification model 140 is to identify important text (such as key identifying terms) associated with each of one or more document types, which are used to generate visual detection targets corresponding to visual regions of a document including the text (with the visual detection targets used to train the student classification model 150 to accurately classify documents into the one or more document types). To note, the teacher classification model 140, which is a text-based classification model, classifies a document based on the text in the document. In some implementations, the classifications of documents generated by the teacher classification model 140 may be used as labels for supervised learning of the student classification model 150 in attempting to classify the same documents into the same document types as the teacher classification model 140 so that the student classification model 150 is trained to classify other documents that may be provided to the student classification model. In some other implementations, such as when the student classification model is to be trained using a different set of documents, labels may be manually generated (such as by one or more reviewers to classify the documents in the training set) and used for training the student classification model.

FIG. 3 shows an example of a teacher classification model 300, according to some implementations. The teacher classification model 300 may be an example implementation of the teacher classification model 140. In many of the examples herein, the teacher classification model 300 (as well as in an apparatus to train the student classification model 150) is depicted as classifying tax documents for clarity in describing aspects of the present disclosure, but the teacher classification model 300 may be configured to classify any types of document. The teacher classification model 300 receives the documents 302 (such as from the database 120 storing the documents or from an interface 110 receiving the documents). The documents may be in any suitable image format, such as a raw image, jpeg, bmp, pdf, or other image formats. For each of the documents 302, OCR 304 is performed on the document to generate an OCRd document 306. To note, the OCRd document 306 may include a plurality of characters identified in the document 302. In some examples of performing OCR on the document 302, the plurality of characters may be output as a stream of characters (such as based on the OCR operation being performed from top-left to bottom-right of the document). The OCRd document 306 may also include text formatting information that may indicate the locations of characters in the document 302 and the formatting of the text (such as font, size, alignment, and so on). The OCR operation may also group neighboring characters from the plurality of characters into a plurality of word sequences. In some implementations, the OCR operation may be from the Python-tesseract (Pytesseract) OCR tool. However, any suitable OCR tool may be used. While the teacher classification model 300 is depicted in FIG. 3 as including an OCR tool, the OCR tool may be outside of the teacher classification model. As such, OCR may be performed on the documents 302 to generate word sequences such that providing a document to the text-based teacher classification model may refer to providing the word sequences in the document generated from an OCR operation (or other OCR outputs) for the document. An OCRd document may refer to the word sequences and other outputs of the OCR operation to be used by the teacher classification model.

As noted herein, the teacher classification model 140 may generate one or more regions of interest (also referred to as visual regions) in a document for one or a plurality of documents, with the regions of interest corresponding to the tightest bounding box around important text identified by the teacher classification model 140 for one or more document types. The regions of interest are used as prediction targets for training a visual-based classification model having a region of interest output layer (such as the student classification model 150). The blocks 308-314 of the teacher classification model 300 are an example implementation of components for generating the regions of interest/prediction targets to be used as additional training signals for training a student classification model. In addition, the blocks 308-312 of the teacher classification model 300 may be used to classify a document.

The word sequences of the OCRd document 306 may be provided to a feature generating engine 308 of the teacher classification model 300 to yield text based features 310. The text based features 310 generated by the engine 308 from a plurality of word sequences are an input to a multi-label, multi-class classification model 312. The text based features 310 may be any suitable features associated with the plurality of word sequences. For example, text based features 310 associated with a term may include the number of times a term appears in a document, the number of total terms in the document, a distribution of the term in the document, and so on. Outputs of the multi-label, multi-class classification model 312 may include a classification of each document 302 into one or more document types and statistical measurements for the terms in the documents indicating the importance (also referred to as relevance) of a term to a collection of documents of the same document type. As used herein, a "word" may refer to any string of characters recognized with a definition. As such, a "word" may include a dictionary word, an initialism, an acronym, a number, or any other suitable string of one or more characters. As used herein, a "term" may refer to any word, bigram of words, or other size n-gram of words.

As noted above, the teacher classification model 300 may classify each document into a document type. In some implementations, a classification model 312 receives the text based features 310 for the documents 302 and is trained to classify a document from the documents 302 based on the text based features 310 generated by the engine 308. For example, a term frequency-inverse document frequency (TF-IDF) algorithm may be performed on the word sequences (such as the terms) from the OCRd documents 306. Performing the TF-IDF algorithm on the terms outputs a plurality of statistical measurements (which may be referred to as TF-IDFs). Each term's TF-IDF measure is a feature for a teacher classification model that is trained to draw non-linear classification boundaries in any suitable (which may be high) dimensional space of the TF-IDF measures from all the data points in the training sets to perform document classification such that the documents are well separated into different classes according to the document type labels. An individual term's TF-IDF measure (or other textual features) differentially affect the teacher classification model's classification boundaries. The extent to which each term affects the classification boundaries for each class is used to determine the relative importance of the term. The classification model 312 may classify each of the documents 302 into one or more document types based on the TF-IDFs (or other suitable statistical measurements) associated with the terms in the document.

An example classification model 312 includes a logistic regression model, which may generate one or more probabilities based on the text based features 310 (such as in generating TF-IDFs or other statistical measurements that are used by the model 312 to generate the one or more probabilities) to indicate whether a document is to be classified as a specific document type. In some examples of identifying whether a document is to be classified as a specific document type, a threshold associated with the one or more probabilities (i.e., one or more fractions, with each fraction being associated with a specific document type) output by a multi-class, multi-label classification model 312 (such as a multi-label logistic regression model) may be compared to the one or more probabilities in order to classify the document into a specific document type. The threshold may indicate a minimum likelihood needed in order to classify a document into a specific document type. For example, if all of the probabilities are less than the threshold for a document, the teacher classification model 300 may prevent classifying the document into any of the document types. In some other examples (such as in single-label settings), the highest probability (such as the largest fraction) output by the multi-class, multi-label classification model 312 is used to classify the document into a document type associated with the highest probability.

In this manner, the documents for which the word sequences (e.g., the terms) are provided to the feature generating engine 308 are classified into one or more document types. As such, a collection of documents for a specific document type includes a plurality of word sequences across the collection of documents. In a specific example, a first classification may be 1099-G tax documents of documents 302, and a second classification may be 1099-Q tax documents of documents 302. A classification model 312 (such as the multi-label logistic regression model or another suitable multi-class multi-label classification model) may be trained to classify the 1099-G tax documents into the first classification and to classify the 1099-Q tax documents into the second classification. The document classifications may be indicated in one or more labels generated by the teacher classification model to be used for training a student classification model.

The collection of 1099-G tax documents include word sequences (such as terms) across those 1099-G tax documents, and the collection of 1099-Q tax documents include word sequences (such as terms) across those 1099-Q tax documents. As described above, the word sequences for the collection of the 1099-G tax documents may be provided to the text based feature generating engine 308 and the trained classification model 312 to generate a statistical measurement indicating the relevance (also referred to as importance or salience) of each word sequence (such as each term) with reference to the collection of 1099-G tax documents. For example, a term that appears in more 1099-G tax documents with more frequency than other terms in the 1099-G tax documents may be considered more relevant (important) to the collection of the 1099-G tax documents. The most important terms in a document classified into a document type (such as the terms associated with the highest statistical measurements as generated by the classification model 312 for the specific document type) may be used to identify the regions of interest of the document to be used as visual detection targets for the multi-task supervised learning of the student classification model to nudge the student classification model into correctly classifying documents with attention on the regions of interest associated with the important terms as identified by the teacher classification model.

As noted above, in some implementations, the plurality of words from the OCRd document 306 may be divided into bigrams of neighboring words. As such, providing the plurality of word sequences to the engine 308 includes providing the bigrams to the engine 308. In addition, the individual words may also be provided to the engine 308. To note, the use of bigrams allows the teacher classification engine 300 to take into account sequentiality of the terms (with two terms needing to appear in order for the bigram). The use of bigrams over larger n-grams may allow the consideration of sequentiality of terms while minimizing processing resources and time required to process word sequences of a document (as larger n-grams require more processing resources and longer times for processing). However, any suitable size n-grams may be used, as using larger n-grams may provide a higher accuracy in identifying relevant word sequences of a document type. As noted above, a "term" may refer to a word, a bigram, an n-gram, or any other suitable sequence of characters. In the specific examples described herein, "terms" is used to refer to individual words and bigrams for clarity in describing aspects of the present disclosure.

As noted above, a statistical measurement for a term indicates a relative occurrence of the term with reference to other terms for a specific document type (such as based on terms in other documents of the same document type), and such statistical measurements may be used to determine a term's importance for a specific document type (such as by the logistic model). In this manner, a statistical measurement may include, for a term, a measurement (such as a number, percentage, or other quantitative measurement) to indicate the term's occurrence for each document type into which a document may be classified. As noted above, the statistical measurement for a term is with reference to the other terms for a document type. In this manner, the statistical measurements associated with a specific document type are used by the teacher classification model to determine which terms are more relevant to the specific document type.

In some implementations, the text classification engine (including the embodiment of the text based feature generating engine 308 and the classification model 312) may be implemented in Python as any suitable text classification model to classify a document. While the classification model 312 is depicted as a logistic regression model to be used in conjunction with a TF-IDF algorithm for performing document classification, any suitable text classification model may be used. For example, other types of text classification models may include an ML model (such as a neural network, a deep learning model, or another suitable ML model), a bag-of-words model, a rule-based model, or any other suitable model other than as depicted to classify documents based on one or more of individual terms (tokens), bi-grams, or n-grams for n greater than 2. Such an ML model may be trained using supervised learning and training data including documents that have already been classified or using unsupervised learning.

As noted above, the classification model 312 may indicate the feature importances of terms as associated with different document types. For example, the classification model 312 may indicate the importance of a first term occurring in at least one document with reference to each of the document types, the importance of a second term occurring in at least one document with reference to each of the document types, and so on for each of the terms occurring across the documents 302. In some examples, the importance of a term for a specific document type may be based on a TF-IDF or another suitable statistical measurement for the term and for the document type. In some implementations, the teacher classification model 300 may identify the key identifying terms for a document type as the most important terms for the document type based on the feature importances (such as importances generated based on the TF-IDFs). For example, the term ranking engine 314 may rank the terms for each document type based on feature importances of the terms for the document type, and the term ranking engine 314 may generate the key identifying terms 316 to be a number of top ranked terms for each of the document types. In some implementations, the term ranking engine 314 of the teacher classification model 300 may limit the number of terms in the key identifying terms 316 associated with a document type to an x number of terms (for any suitable integer x) based on the ranking of terms on feature importances associated with the specific document type. For example, the teacher classification model 300 may limit the number of key identifying terms to be associated with each document type to 20 terms. In this manner, the top 20 terms based on the feature importances for the document type may be considered the most important terms (key identifying terms) for the document type, and a portion of the remaining terms below the top 20 terms may be considered spurious terms for classification into the specific document type. As described herein, the key identifying terms for a document type may be used to identify regions of interest in a document of the document type, with the regions of interest to be used as visual detection targets for training a visual-based student classification model. If the key identifying terms for a document type is limited to x number of terms (such as 20 terms), the regions of interest in a document of the document type are limited to areas of the document corresponding to terms in the x number of terms for the document type.

To note, the teacher classification model 300 may be used to classify any document that may be filled or unfilled. In some implementations, a repository of completed tax returns including a plurality of completed tax documents may be provided to the teacher classification model 300. In completed tax documents, the tax document includes text from the tax authority (such as from an unfilled tax form from the IRS) and text input for the person associated with the completed tax document. The text completed for the person is typically personal information specific to the person. As such, such text may not be relevant to classifying the tax document (which may be referred to as spurious text or terms). While not depicted in the teacher classification model 300, for tax documents 302 that are completed for one or more persons, the teacher classification model 300 identifies personal information text as spurious text. As such, personal information text may be prevented from being included as a key identifying term for a document type. In some implementations of identifying personal information text, the teacher classification model 300 receives an unfilled form from the tax authority for the specific document type of the completed form, and the teacher classification model 300 identifies the terms of the completed tax form not included in the unfilled form. The terms from the filled tax form not included in the unfilled tax form may thus be identified as spurious terms, and the remaining terms may be processed to identify the specific terms that are relevant to the classification. To note, in some implementations, the identification of key identifying terms associated with a document type is based on the processing of an unfilled document associated with the document type in addition or alternative to the processing of a filled document associated with the document type. For example, the key identifying terms associated with a 1099-G tax document classification is based on the terms in an unfilled 1099-G form that is processed by the teacher classification model.

While not depicted in FIG. 3, the teacher classification model may output one or more of the list of key identifying terms (or a longer list of important terms) for one or more document types, the relative importances of the terms for the one or more document types, an overall list of terms of each document or of each document type, or other information generated by the various components depicted in FIG. 3. The information generated may be stored in a storage (such as in the database 120 of the system 100). In some implementations, the interface 110 may output the key identifying terms and associated feature importances for one or more document types for display to a user. In this manner, a user may be apprised of the terms of most importance (such as the top 20 terms) to a specific document type. As noted above, a feature importance of a term for a document type may be a quantifiable relative importance of the term with reference to other terms for the document type, which may be based on the TF-IDFs or other statistical measurements generated for the terms. The feature importance for a term and for a specific document type may be generated in any suitable manner (such as by directly using the TF-IDFs or other statistical measurements or by converting the TF-IDFs or other statistical measurements into a representation of the importance of a specific term).

For a document classified by the classification model 312 into a specific document type for which the important text (such as the key identifying terms for the specific document type) are to be identified in the document, the teacher classification model 300 may provide one or more of the terms in the document, the feature importances associated with the terms and the document type, the key identifying terms for the document type, and the document itself to a visual detection target generating engine 317. For example, a document of a document type and the key identifying terms included in the document based on the feature importances for the document type may be provided to the visual target generating engine 317, and the visual detection target generating engine 317 identifies the regions corresponding to the key identifying terms for the document type included in the document. In some implementations, the visual detection target generating engine 317 may use fuzzy string searches to identify whether the key identifying terms exist in the character stream in the OCRd document 306. Through the use of a fuzzy string search, errors that may occur during the OCR (such as missed characters or wrong characters) may not prevent the identification of the term in the OCRd document. In addition, fuzzy string searches may allow identifying similar terms that may not be exactly the same (such as whether a word is singular or plural). The visual detection target generating engine 317 also identifies a region of interest (also referred to as a visual region) corresponding to each of the key identifying terms identified in the document based on the location of the term in the document.

The regions of interest in the document for the identified terms may be used as visual detection targets 320, which may be used by a student classification model for predicting whether an object for a document type. A visual detection target may also be referred to as a prediction target. The collection of prediction targets (such as the collection of visual detection targets 320 corresponding to the key identifying terms in the document) may be included in an ROI mask associated with the document. For example, a classified document with the identified visual regions 318 may be a visual representation of an ROI mask indicating pixels outside of the visual detection targets 320 that are to be disregarded (with the pixels inside the visual detection targets 320 remaining for comparison). As depicted, the visual detection targets 320 may be included in bounding boxes around the identified terms in the document. As such, the visual detection target generating engine 317 may generate the bounding boxes based on the locations of the key identifying terms for the document type in the classified document. In some implementations, if a bigram (or another n-gram) is identified as a key identifying term and is identified in the document, a bounding box may be generated around each word of the bigram (or other size n-gram). Alternatively, a bounding box may be generated around the entirety of the bigram (or other size n-gram). In some implementations, the size of a bounding box is just large enough to include the pixels associated with the term without including a border of one or more pixels completely encircling the term. For example, if text is black pixels on a white background, the bounding box may be sized to include all of the black pixels of the term such that at least one black pixel of the term touches the bounding box boundary. However, the bounding box may be generated in any suitable manner to include the pixels associated with the term (such as based on a fixed size, a fixed height, a size based on the number of characters in the key identifying term, and so on).

The bounding boxes may be used as the prediction targets for use by a visual-based classification model. In addition, a collection of bounding boxes may be used to generate an ROI mask for identifying pixels to be compared, which may be a prediction target for use by a visual-based classification model. A predicted mask may also be generated by a student classification model 150 or another component, such as described below with reference to FIGS. 4-6. To note, while the visual detection targets 320 are depicted as bounding boxes and a mask (and the examples herein describe visual detection targets as bounding boxes and a mask), the visual detection targets may be any suitable bounded two dimensional regions. For example, a visual detection target may be exclusively the pixels of the document associated with the identified term (such as only the black pixels of the characters, thus precluding any white pixels outside of the characters). In another example, a visual detection target may be an oval or another suitable shape (or a plurality of shapes) to include the identified term (or a plurality of identified terms). To note, while engine 317 is depicted in FIG. 3, which is directed towards a teacher classification model, the engine 317 may be included in a pre-processing engine for training a student classification model (such as depicted in FIG. 6) or otherwise outside of the teacher classification model. As such, the teacher classification model may provide the key identifying terms for each of one or more document types, with the key identifying terms to be used to generate bounding boxes or masks for a document.

The generated visual detection targets (such as the bounding boxes and corresponding masks, which may include the pixel values of pixels from the associated document) generated from the important terms (key identifying terms) for the document types identified by the teacher classification model 140 of the system 100 may be part of the training data used to train a student classification model 150. If the student classification model is to classify a document already classified by the teacher classification model, the training data may also include labels indicating the classifications generated by the teacher classification model, with the labels to be used for supervised learning of the student classification model 150. Alternatively, the training data may include labels generated manually for one or more documents to be classified by the student classification model (such as when the student classification model is to classify documents not before classified by the teacher classification model). Based on the bounding boxes and the masks (or other visual detection targets) for key identifying terms for different document types, the student classification model 150 may be trained to identify regions of interest associated with specific key identifying terms for one or more document types.

In some implementations, the student classification model 150 is a multi-label, multi-class classification model to indicate whether or not a document is to be classified into a specific classification. In this manner, the student classification model 150 may generate multiple binary classification outputs to classify a document into one or more document types. For example, a binary classification output associated with a specific document type may indicate whether or not the document is to be classified into the specific document type. As such, a binary classification output may be generated for a document for each of the potential document types for classification of the document. In some implementations, the student classification model 150 generates the multiple binary classification outputs concurrently (such as in parallel). In a specific example of creating a student classification model 150, a Mask Region-based Convolutional Neural Network (Mask-RCNN, which is an architecture for object detection and panoptic segmentation) may be implemented and modified by adding a multi-layer perceptron (MLP), which is used for supervised learning of multi-label, multi-class classifiers. In some implementations, a classification output layer including the Mask-RCNN takes an input directly from a convolutional neural network (CNN) backbone (such as a residual neural network (resnet or RESNET) backbone), with the CNN backbone generating the feature map to be used as a mask by a mask layer. The student classification model 150 may be trained with multi-tasking a document classification objective (such as whether or not a tax document is to be classified as a 1099-G tax document and one or more other potential tax document types) using document level (or page level for multiple page documents) loss measurements simultaneously with the regions of interest detection objective using the visual targets derived from the teacher model importance features. In training the student classification model 150, one or more binary cross entropy (BCE) losses associated with one or more binary classifications are reduced during supervised learning. Example implementations of a student classification model 150 for training are depicted in FIGS. 4-5, which are described below. As noted herein, training the student classification model 150 includes multi-task supervised learning using the training data generated by and the documents previously classified by the teacher classification model 140.

FIG. 4 shows an example of a student classification model 400 for training, according to some implementations. The student classification model 400 may be an example implementation of the student classification model 150 in system 100. One of the output layers of the student classification model 400 is a bounding box layer 412, which is to be trained by comparing the locations of a document (which is previously classified by the teacher classification model into a specific document type) as generated by the student classification model and specific bounding boxes (or other prediction targets) generated by the teacher classification model for the document. The bounding box layer 412 is trained to output the coordinates (or another suitable location indication) of the bounding boxes in a document. Another output layer of the student classification model 400 is a mask layer 414, which is to be trained to output pixel level binary classifications identifying whether an individual pixel is part of one of the important texts (such as a key identifying term) identified by the teacher classification model for the document type. A final output layer of the student classification model 400 is a whole page classification layer 410. The whole page classification layer is trained to classify a document (or a page of a multi-page document) into a specific document type. To note, the bounding box layer 412 and the mask layer 414 are used to control the training of the whole page classification layer 410. Once the student classification model 400 is trained, the bounding box layer 412 and the mask layer 414 may be removed such that only the whole page classification layer 410 remains for classifying a document.

As depicted in FIG. 4, the student classification model 400 receives a document image 402. The document image 402 is from a document included in one or more documents to be classified by the student classification model 400. To note, the one or more documents may have been previously classified by the teacher classification model and to be used to train the student classification model 400. Alternatively, the one or more documents may be a completely separate set of documents from those used by the teacher classification model to generate the important terms for each document type. While not depicted in FIG. 4, the student classification model 400 also receives training data, such as the important terms for each document type identified by the teacher classification model, bounding boxes associated with the important terms, and/or a mask including the bounding boxes. The document image 402 is provided to a visual based feature extractor 404 to generate a feature map of one or more visual features of the document. In some implementations, the visual based feature extractor 404 includes a convolutional neural network (CNN) backbone to generate one or more bounding boxes in the document image 402 and one or more masks including or indicating pixels whose pixel values in the document image may be associated with the key identifying terms identified in the document by the teacher classification model. In some examples, the CNN backbone includes a resnet backbone (such as a resnet50 backbone). In some other implementations, the visual features of the feature map may be any suitable image statistics or information generated by the extractor 404 from the document image 402 and to be used to identify or generate one or more regions by the region proposal network (RPN) 406.

In a simplified example, if the visual based feature extractor 404 (such as a CNN backbone) is to generate a feature map for a document image 402 of a tax document of a 1099-G classification for tax documents (and the feature map is to include one or more bounding boxes and masks for the document image 402), the visual based feature extractor 404 may receive the document image 402 of the 1099-G form to generate one or more bounding boxes to potentially be associated with the bounding boxes generated based on the key identifying terms identified by the teacher classification model (such as for any top 20 terms) that are associated with the 1099-G document type. The number, locations, and/or sizes of the bounding boxes generated based on the terms serve as the training targets for the bounding box layer 412. The visual based feature extractor 404 may also generate a mask of pixel values of the 1099-G tax document image that potentially may be associated with the mask of pixel values for the bounding boxes generated. The pixel values of the pixels in the mask (such as in the bounding boxes of the document)serve as the training targets for the mask layer 414. Once training is completed, the visual based feature extractor 404 is able to generate a feature map including visual prediction targets (such as bounding boxes and masks) for a document image of a document, and the document may be classified by the student classification model 400 (such as by the whole page classification model 410) into one or more document types based on the feature map (thus removing the need for the teacher classification model for classification).

For a document to be classified based on the feature map, the feature map including a plurality of visual prediction targets is provided to a multiple region of interest (multi ROI) alignment engine 408 to attempt to align portions of the document for the visual features of the feature map. In some implementations, the feature map is provided to a region proposal network (RPN) 406 to predict or propose regions of interest in which the visual features may lie in the document (such as one proposed region for each visual feature). For example, the proposed regions of interest may be based on the locations of the generated bounding boxes, with the proposed regions of interest being provided to the multi ROI alignment engine 408. The multi ROI alignment engine 408 may expand, contract, or shift the various ROIs to attempt to reduce the dissimilarity between the regions of interest predicted by the RPN 406 for the document and the bounding boxes generated by the teacher classification model for the important terms. To note, the regions of interest that are proposed may be referred to as objects to be identified in a document. The output of the multi ROI alignment engine 408 may include the information regarding the adjusted ROIs (such as size, location, and number of ROIs in a document) for classification purposes.

The bounding box layer 412 identifies, across one or more ROIs or bounding boxes generated by the student classification model 400, a similarity between a bounding box generated for a term and a region of interest generated by the student classification model in the document closest to or otherwise associated with the bounding box. For example, the bounding box layer 412 may compare the size and location of the student classification model generated ROI in the document to the size and location of the bounding box generated for an important term (also referred to as key identifying term) identified by the teacher classification model. If the document was previously classified by the teacher classification model, the location of bounding boxes corresponding to the key identifying terms as identified by the teacher classification model should align with the predicted ROIs from the student classification model. Any difference between the ROIs and the bounding boxes may be considered an error or loss to be minimized during training of the student classification model 400.

The mask layer 414 identifies a similarity between pixel values of the document image based on a mask generated from the multiple ROI aligned by the engine 408 and pixel values of the document based on a mask generated by the teacher classification model. As noted above, the mask layer 414 may perform a plurality of pixel level binary classifications identifying whether an individual pixel is part of one of the key identifying terms for the document as identified by the teacher classification model.

Since the locations of one or more ROIs may be aligned to better fit the locations of the bounding boxes for the key identifying terms as identified by the teacher classification model, the pixels to be compared may be based on the alignment of the ROIs, which may be indicated by the multi ROI alignment engine 408. In addition, the pixels to be compared may be based on any adjustments to the ROIs or indicated differences between the ROIs and bounding boxes as determined by and that may be provided from the bounding box layer 412 to the mask layer 414. In this manner, the mask generated by the student classification model and to be applied to a document to be classified by the student classification model 400 may be the arrangement of ROI after alignment by the engine 408 and after adjustment based on the bounding box layer 412. In the mask layer 414, the difference in pixel values between the document pixels in the predicted ROIs generated by the student classification model 400 and the document pixels in the bounding boxes generated by the teacher classification model may be summed across the pixels. Such a difference (which may also be referred to as an error or loss) may be used to train the student classification model 400 to generate a mask closer and closer to a mask generated for the key identifying terms identified by the teacher classification model for a document type (with the difference getting smaller and smaller during training). As such, in training the student classification model 400, the difference between the pixel values as masked in the document image by the student classification model 400 (also referred to as the prediction values) and the pixel values as masked based on the key identifying terms as identified by the teacher classification model (also referred to as ground truths or ground truth values), with the mask being derived based on the key identifying terms identified by the teacher classification model for a document type, may be used as a loss or error. In training the student classification model 400 based on a loss generated at the bounding box layer 412 and based on a loss generated at the mask layer 414, the losses from the layers 412 and 414 are additional/auxiliary losses for training the student classification model. Such auxiliary losses may cause the student classification model during training to improve its ability to generate individual ROIs (which may be associated with potential individual key identifying terms that would be identified by bounding boxes that would be generated based on the key identifying terms identified by the teacher classification model) and a collection of ROIs (which may be associated with the potential collection of key identifying terms that would be identified by a mask). The improved ROIs and collection of ROIs proposed by the student classification model 400 may be used by the whole page classification layer 410 to classify a document.

In some implementations, the student classification model 400 includes a whole page classification layer 410. As noted above, the whole page classification layer 410 classifies a document (or a page of a document) based on the ROIs as provided by the multi ROI alignment engine 408. In training the whole page classification layer 410, the labels from the teacher classification model indicating the document types to which the different documents were classified are used as training targets for the whole page classification layer 410. As such, any differences in the classifications by the whole page classification layer 410 for a plurality of documents and the classifications by the teacher classification model for the same plurality of documents is an error or loss to be minimized during training. As training of the student classification model 400 progresses, the whole page classification layer 410 is to get closer and closer to the same document types as previously labeled (such as being manually labeled).

As noted above, training the student classification model 400 includes an MLP layer. The loss from the bounding box layer 412 and the loss from the mask layer 414 are combined with a loss associated with the whole page classification layer 410 (such as a document classification BCE loss from the MLP layer prediction) to generate an overall loss associated with the student classification model 400. Training the student classification model 400 may thus include adjusting one or more of the extractor 404, the RPN 406, the multi ROI alignment engine 408, the bounding box layer 412, the mask layer 414, or the whole page classification layer 410 to minimize the overall loss (which is a multi-task combined loss). Once the student classification model 400 is trained, the bounding box layer 412 and the mask layer 414 may be removed. In this manner, the trained student classification model 400 includes the trained components including the object classification layer 410 but minus the bounding layer 412 and the mask layer 414.

In FIG. 4, the whole page classification layer 410 is depicted as being after the multi ROI alignment engine 408 such that the whole page classification layer receives outputs from the engine 408 to classify a document into one or more document types. In some implementations, alternative to the whole page classification layer 410 being after the multi ROI alignment engine 408, the whole page classification layer may be before the multi ROI alignment engine such that the whole page classification layer receives the feature map from the extractor and is trained to classify the document based on the feature map.

FIG. 5 shows another example of a student classification model 500 for training, according to some implementations. The student classification model 500 may be an example implementation of the student classification model 150 in the system 100, and the student classification model 500 is to be trained based on training data from a teacher classification model. In comparison to the student classification model 400 in FIG. 4, the only difference between the classification models 400 and 500 is that the student classification model 500 includes a whole page classification layer 510 before the multi ROI alignment engine 508 instead of after the multi ROI alignment engine 408 as depicted in FIG. 4. As such, the input to the whole page classification layer 510 may be a feature map from the extractor 504 instead of the aligned ROIs from the engine 408 as depicted in FIG. 4, with the whole page classification layer 510 to be trained to classify a document based on the feature map output by the extractor 504. Regarding the other components depicted in FIGS. 4 and 5, the document image 502 may be the same as the document image 402, the visual based feature extractor 504 may be the same as the visual based feature extractor 404, the RPN 506 may be the same as the RPN 406, the multi ROI alignment engine 508 may be the same as the multi ROI alignment engine 408, the bounding box layer 512 may be the same as the bounding box layer 412, and the mask layer 514 may be the same as the mask layer 414. In addition, the overall loss described above with reference to training the student classification model 400 depicted in FIG. 4 may be the same for the student classification model 500. Similar to as described above with reference to FIG. 4, any difference in the classifications from the whole page classification layer 510 and the classifications from the teacher classification model (which may be referred to as document type ground truths from the teacher classification model) for the same plurality of documents may be considered a loss that is to be minimized. Similar to as described above with reference to the student classification model 400 depicted in FIG. 4, once the student classification model 500 is trained, the bounding box layer 512 and the mask layer 514 may be removed from the student classification model 500. In some implementations, other components (such as the RPN 506) may also be removed if the whole page classification layer 510 is not to base its classifications on the outputs from such components.

If a student classification model is implemented in software (such as being written in the Python programming language executed by the processor 130 of the system 100), a bounding box layer, a mask layer, or any other layers or components that may be removed after training may be removed by conditionally deleting the layers from the architecture. In this manner, the layer may be reinserted in the future for retraining the student classification model.

FIG. 6 shows a detailed implementation of an example training architecture for a student classification model 600, according to some implementations. The architecture 600 includes the data preparation step for preparing data to be used in training the student classification model. The student classification model in FIG. 6 may be an example implementation of the student classification model 500 depicted in FIG. 5 or the student classification model 400 depicted in FIG. 4. As noted below, pre-processing may include generating visual prediction targets (such as bounding boxes and masks) based on the key identifying terms identified by the teacher classification model for the different document types.

The document image 602 is to be classified by the student classification model in FIG. 6. The document image 602 (which may also be referred to as document 602) may be the same as the document image 402 and the document image 502. The document annotation and preprocessing engine 604 may perform denoising on the image, generate measurements indicating the size or other information regarding the image, or perform other operations to prepare the document 602 for processing and classification. During annotation of the document 602, the engine 604 may identify the one or more bounding boxes generated for the document based on the key identifying terms identified by the teacher classification model. As noted herein, in training the student classification model, the generated bounding boxes corresponding to key identifying terms may be compared to the ROIs generated by the student classification model for the document image 602 to calculate a difference as a loss that is part of a multi-class combined loss to be minimized during training. The engine 604 may also identify the mask or other visual features of the document 602 corresponding to the key identifying terms. As noted herein, in training the student classification model, the generated mask associated with the key identifying terms identified by the teacher classification model may be compared to a mask based on the collection of ROIs generated by the student classification model for the document image 602 to calculate a pixel level value difference as a loss that is also part of the multi-class combined loss to be minimized during training. The prepared document image (including the bounding boxes, mask, or other visual features) is provided to an image+mask transform component 606 and to a bounding box transform component 608.

In some implementations, the image+mask transform component 606 may adjust the document image 602 or the visual features for any visual distortions in the document image 602. For example, a fisheye lens or other optical characteristics may cause distortions in the image of the document. In another example, the document image 602 may be of a different size than documents classified by the teacher classification model. The image+mask transform component 606 may thus measure such distortions or differences. Any suitable means for measuring optical distortions or differences may be implemented, such as being based on curve distortions occurring in straight lines, based on warping of the image at the edges or corners, based on known characteristics of a known optical device used to capture the image, based on the known differences in size between the documents being classified by the teacher classification model and the student classification model, and so on. In some implementations of determining a difference in size, the document input to a teacher classification model may be based on a defined size, and the image+mask transform component 606 may identify a difference in size of the document image 602 from the defined size. The differences (such as size difference measurements) may be used to generate a scaling factor 609 indicating an amount that a bounding box and/or a mask of bounding boxes is to be scaled to fit the document image 602. As such, the scaling factor 609 may be used to scale or otherwise adjust the bounding boxes or the masks so that they may be used for an accurate comparison between ROIs from the student classification model and bounding boxes associated with key identifying terms identified by the teacher classification model and between pixel values of pixels from a mask by the student classification model and from a mask associated with key identifying terms identified by the teacher classification model. In some implementations, the image+mask transform component 606 may adjust both the document image 602 and the mask to be applied to the document image 602. The scaling factor 609 may also be provided to the bounding box transform component 608. The bounding box transform component 608 may scale or otherwise adjust the bounding boxes associated with key identifying terms to identify how each bounding box generated by the engine 604 is to be adjusted based on the scaling factor 609. For example, a bounding box may be shifted, resized, or warped based on the scaling factor 609.

During training of the student classification model, one or more of the adjusted image, the adjusted mask, or the adjusted bounding boxes are provided to the resnet50 backbone 610. The resnet50 backbone 610 is an example implementation of the visual based feature extractor 504 in the student classification model 500 or the visual based feature extractor 404 in the student classification model 400 (which may be a CNN backbone). The resnet50 backbone 610 generates a feature map for the document 602.

A combination of components 618 and 622 may be an example implementation of the RPN 506 and the multi ROI alignment engine 508 in the student classification model 500 or the RPN 406 and the multi ROI alignment engine 408 in the student classification model 400. The fast region based CNN (RCNN or R-CNN) predictor 618 may generate proposed ROIs for potential locations of key identifying terms in the document 602 based on visual features from the feature map. While a fast RCNN predictor 618 is depicted in the student classification model, any other suitable predictor may be used to generate the ROIs, such as an RCNN based predictor or a faster RCNN based predictor.

The bounding box layer 620 is an example implementation of the bounding box layer 512 in the student classification model 500 or the bounding box layer 412 in the student classification model 400. For example, the bounding box layer 620 may compare the bounding boxes associated with key identifying terms (which may be adjusted by the bounding box transform 608) and the ROIs proposed by the predictor 618 to identify differences between the bounding boxes and the proposed ROIs. Any difference identified may be considered a loss or error for the bounding box layer 620 (such as described above with reference to FIG. 4). For example, in training the student classification model in FIG. 6, the loss or error associated with the bounding box layer 620 may be included in a combined multi-task loss to be minimized.

The mask RCNN predictor 622 may generate a mask based on the proposed ROIs (such as from the fast RCNN predictor 618). The mask identifies the pixels of the document 602 whose pixel values may be compared to pixels identified by the mask associated with the key identifying terms (which may be adjusted by the image+mask transform 606).

The mask layer 624 is an example implementation of the mask layer 514 in the student classification model 500 or the mask layer 414 in the student classification model 400. For example, the mask layer 624 may compare pixel values at a pixel level based on the mask generated by the predictor 622 and the mask generated by the teacher classification model to generate a difference (such as described above with reference to FIGS. 4 and 5), which may be considered a loss or error to be included in the multi-task combined loss used for training the student classification model.

As noted above, a whole page classification layer is used to classify the document 602. The document type classifier 616 is an example implementation of the whole page classification layer 510 in the student classification model 500 or the whole page classification layer 410 in the student classification model 400. The document type classifier 616 may generate a classification based on an output from a maxpool+FC layer component 612. The component 612 may be a last layer of the CNN including the resnet50 backbone 610, with the fast RCNN predictor 618 and the mask RCNN predictor 622 being different last few layers of the same CNN. A maxpool operation from the component 612 may include down-sampling the feature map or other information from the resnet50 backbone 610 into a smaller size dataset. The output may be the same shape (such as the same number of dimensions) but a different size, or the maxpool operation may flatten the feature map or other information (such as into fewer dimensions).

The fully connected (FC) layer of the component 612 may be an end of the CNN architecture for the whole page classification layer branch. The FC layer may receive the output of the maxpool operation (which may be a flattened output) and generate a document (or page) classification score for one or more classifications based on the output. The classification scores may be used by the document type classifier 616 to classify the document 602 into one or more document types. As noted above, a difference in classification by the document type classifier 616 and the teacher classification model that previously classified the document 602 may be used as a loss that is included in the overall loss. Similar to as described above with reference to FIGS. 4 and 5, the bounding box layer, the mask layer, or other components whose outputs are not relied upon by the document type classifier 616 to classify a document may be removed from the student classification model 600 after training of the student classification model 600 is complete.

Referring back to FIG. 1, in some implementations, the teacher classification model 140 and the student classification model 150 are implemented in the Python programming language, and the code may be stored in a code repository or another suitable storage of the system 100 for execution by the processor 130. While the teacher classification model 140 and the student classification model 150 are depicted as separate individual components of the system 100, the components 140 and 150 may include additional components, may include software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. In other implementations, components of the system 100 may be distributed across multiple devices, may be included in fewer components, and so on. For example, in some implementations, the teacher classification model 140 may reside on a separate system from system 100 including the student classification model 150. While the examples herein are described with reference to system 100, any suitable system may be used to perform the operations described herein.

Figure 7:
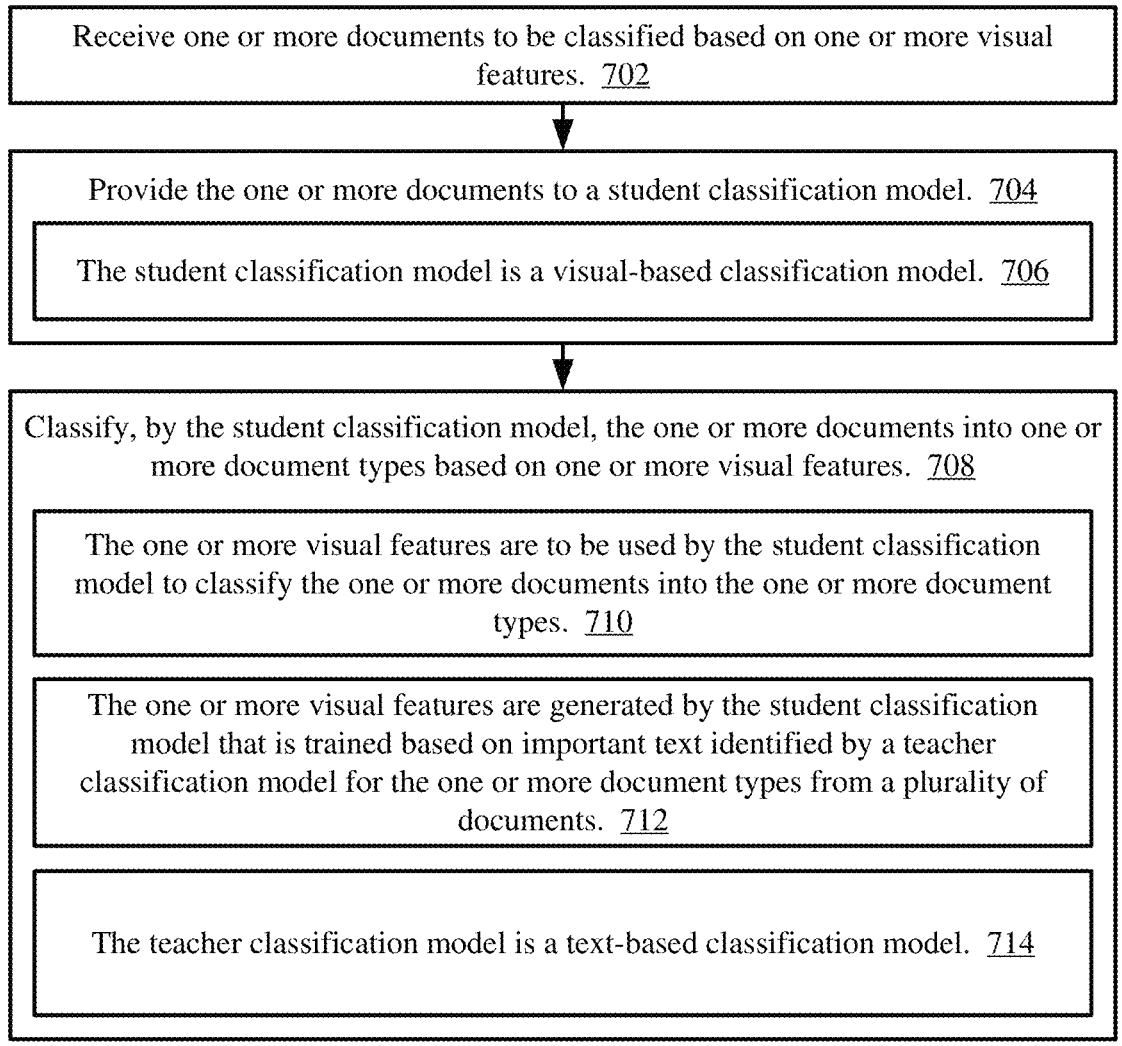
FIG. 7 shows an illustrative flow chart depicting an example operation for classifying documents by a student classification model, according to some implementations.
Figure 9:
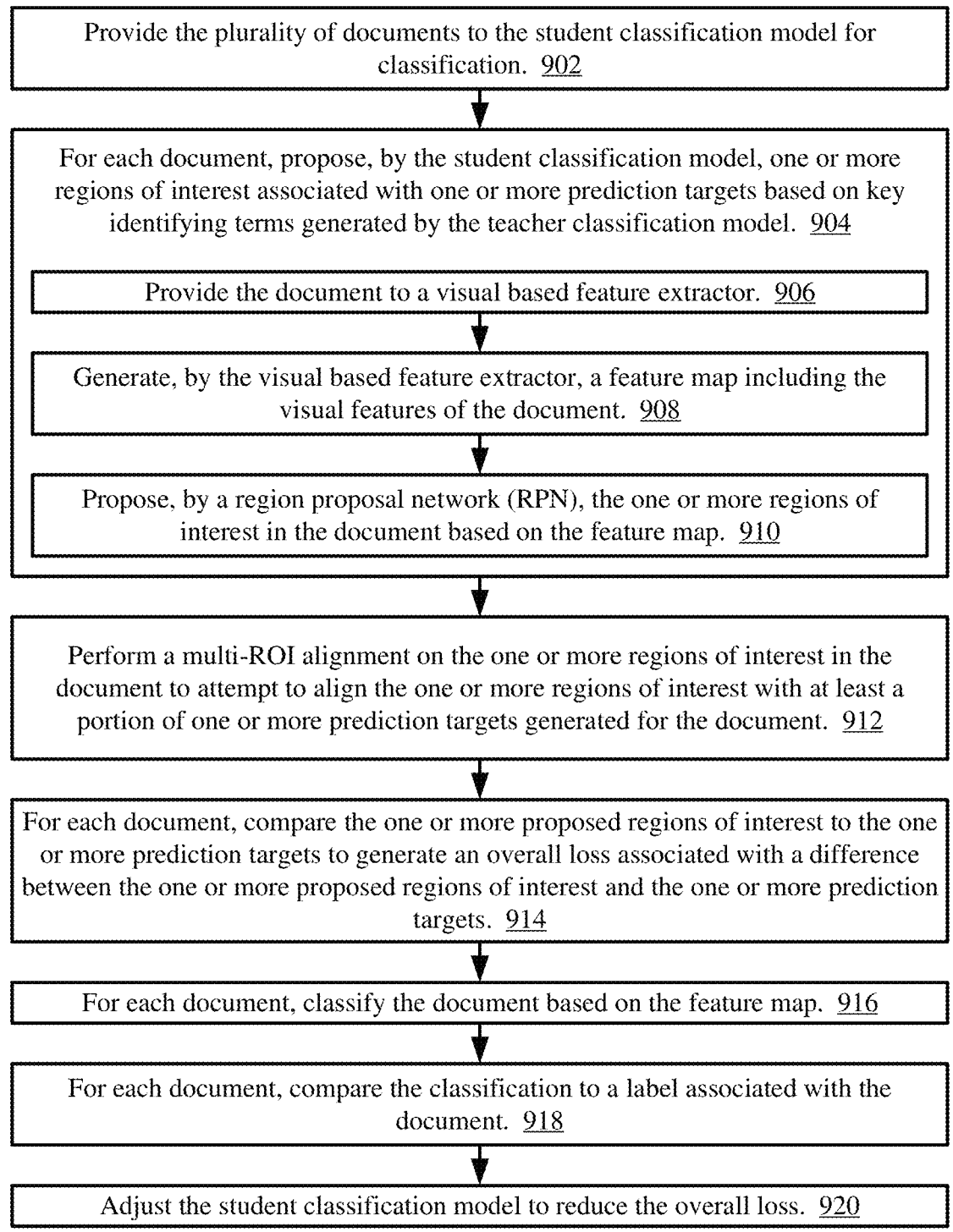
FIG. 9 shows an illustrative flow chart depicting an example operation for training a student classification model, according to some implementations.

As described above, various implementations and operations of a teacher classification model and a student classification model to be trained are depicted in FIGS. 4-6 and disclosed herein. FIGS. 7-9 depict various processes that may be performed by one or both of the student classification model and the teacher classification model. In particular, FIG. 7 depicts an example process that may be performed by a student classification model after training, FIG. 8 depicts an example process that may be performed by a teacher classification model to generate training data to be used in training a student classification model, and FIG. 9 depicts an example process that may be performed by a system to train a student classification model.

FIG. 7 shows an illustrative flow chart depicting an example operation 700 for classifying documents by a student classification model, according to some implementations. The example operation 700 is described as being performed by the system 100 (including the student classification model 150) for clarity, but any suitable system may be used to perform the example operation 700.

At 702, the system 100 receives one or more documents to be classified based on one or more visual features. In particular, the student classification model 150 is trained to classify the one or more documents by generating the one or more visual features (such as in a feature map generated for each document). As described above, the student classification model 150 is trained using training data derived from the key identifying terms identified by the teacher classification model 140, which may include corresponding classification targets(labels) for the same documents being classified and prediction targets as bounding boxes and masks corresponding to important text (such as the key identifying terms) identified by the teacher classification model.

At 704, the system 100 provides the one or more documents to the student classification model 150. As noted herein, the student classification model is a visual-based classification model (706). In the example, the student classification model is already trained (such as described above) to classify a document based on the visual features (such as from the feature map that the student classification model 150 is trained to generate).

At 708, the system 100 classifies (such as by the student classification model 150) the one or more documents into one or more document types based on one or more visual features. As noted above, "document type", "classification", and "category" may be used interchangeably. The one or more visual features are to be used by the student classification model 150 to classify the one or more documents into the one or more document types (710), and the one or more visual features are generated by the student classification model 150 that is trained based on important text identified by the teacher classification model 140 for the one or more document types from a plurality of documents (712). As noted above, the teacher classification model 140 is a text-based classification model (714).

For example, as described above, the teacher classification model 140 may identify important text (such as key identifying terms) associated with each document type. The teacher classification model 140 may also generate one or more bounding boxes associated with the important text (such as the top 20 terms or other grouping of key identifying terms) occurring in the collection of documents of the document type. For key identifying terms being associated with a document type, the one or more bounding boxes indicate the locations of the key identifying terms in a document classified into the document type. As described above, in training the student classification model 150, the bounding boxes associated with key identifying terms identified by the teacher classification model 140 may be compared to ROIs proposed by the student classification model, the pixel values of pixels of the document as identified by a mask generated by the student classification model 150 from the proposed ROIs may be compared to pixel values of pixels as identified by a mask generated from the bounding boxes associated with key identifying terms identified by the teacher classification model 140, and the classifications by the student classification model 150 may be compared to the ground truths for the same documents to determine differences, which may be embodied in an overall loss used in training the student classification model 150. As such, the bounding boxes and masks associated with key identifying terms identified by the teacher classification model 140 are included in training data used to train the student classification model 150 in order for the trained student classification model 150 to be able to classify new documents. Use of such bounding boxes and masks for training are described above with reference to FIGS. 4-6.

FIG. 8 shows an illustrative flow chart depicting an example operation 800 of a teacher classification model that is trained to identify key identifying terms, with the key identifying terms being used to generate the training data for training the student classification model, according to some implementations. As noted above, the training data may include bounding boxes and masks corresponding to key identifying terms identified the teacher classification model. The example operation 800 is described as being performed by the teacher classification model 140 (such as the teacher classification model 300) for clarity.

At 802, the system 100 receives a plurality of documents to be classified by the text-based teacher classification model 140 into one or more document types. The plurality of documents may be annotated using the key identifying terms as identified by the trained teacher classification model 140 and by the student classification model 150 in order to train the student classification model 150. At 804, for each of the plurality of documents, the teacher classification model 140 receives a plurality of terms included in the document, wherein the terms are based on OCR performed on the document. Examples of OCR are described above with reference to FIG. 3.

At 806, the teacher classification model 140 identifies one or more terms of the plurality of terms as key identifying terms for a document type based on occurrences of the one or more terms relative to occurrences of other terms in the plurality of terms in the plurality of documents. For example, at 808 and referring back to FIG. 3, the feature generating engine 308 of the teacher classification model 300 generates statistical measurements (such as TF-IDFs or other text based features 310) for the plurality of terms from the plurality of documents. As noted above, the statistical measurements indicate the occurrence of the term relative to the other terms for the document type. At 810, the classification model 312 of the teacher classification model 300 generates a relative importance measurement for each of the plurality of terms based on the statistical measurements and the document type, with the relative importance measurement indicating an importance of the term with reference to other terms in the plurality of terms. As noted herein, a relative importance measurement may be specific to a combination of a term and a document type. In some examples of generating a relative importance measurement, the teacher classification model may perform a term frequency-inverse document frequency (TF-IDF) algorithm on the terms in the plurality of documents to output a plurality of statistical measurements indicating the relative occurrence of a term in documents classified to a document type, and the teacher classification model may use the statistical measurements to generate a measurement of the relative importance of each term for each document type. As such, the relative importance measurement for the term for the document type may be based on the influence of the statistical measurements (such as TF-IDF) on the teacher classification model's decision boundary with respect to each class in a multi-dimensional space defined by the statistical measures. Example implementations of generating a relative importance measurement are described above with reference to FIG. 3.

At 812, the term ranking engine 314 of the teacher classification model 300 ranks the plurality of terms based on the relative importance measurement. At 814, the term ranking engine 314 of the teacher classification model 300 identifies the key identifying terms 316 for the document type based on the ranking. Example implementations of each of the blocks 808-814 are described above with reference to FIG. 3.

With the key identifying terms identified for one or more document types by the teacher classification model, for each of the plurality of documents, the key identifying terms may be located in the document (816) to generate bounding boxes or other visual prediction targets associated with the key identifying terms. As noted above, the key identifying terms output by the teacher classification model for the different document types may be used to generate prediction targets associated with the key identifying terms (such as bounding boxes and a mask associated with the key identifying terms of a document type). As such, the key identifying terms may be used to generate, for each of the plurality of documents, one or more prediction targets in the document based on the locations of the key identifying terms in the document (818). For example, referring back to FIG. 3, the visual detection target generating engine 317 may identify key identifying terms that are located in a document, and the visual detection target generating engine 317 may generate the visual detection targets 320 in the document, with the visual detection targets being associated with the locations of the key identifying terms in the document. In another example, the preprocessing engine in FIG. 6 may be used to generate one or more visual detection targets. At 820, the training data is generated based on the locations of the key identifying terms along with the document types ground truths to train a student classification model, wherein the training data is based on the one or more prediction targets and the document class ground truths. In some implementations, the prediction targets include one or more bounding boxes in the document, with each of the one or more bounding boxes being associated with a location of a key identifying term in the document. Additionally or alternatively, the prediction targets include a mask generated to include the one or more bounding boxes in the document. Examples of generating the bounding boxes and the mask is described above with reference to FIG. 3 and with reference to FIG. 6.

With the training data generated for a plurality of documents based on the key identifying terms from the teacher classification model 140, the student classification model 150 may be trained using the training data in classifying documents.

FIG. 9 shows an illustrative flow chart depicting an example operation 900 for training a student classification model, according to some implementations. The example operation 900 is described as being performed by the system 100 (including the student classification model 150) for clarity. In some implementations, the processes in the example operation 900 may be performed by the apparatuses depicted in FIG. 4, FIG. 5, or FIG. 6. FIG. 4 is referred to in the description for clarity.

At 902, the plurality of documents with the prediction targets derived from key identifying terms identified by the teacher classification model along with the document type ground truths are the training data that are provided to the student classification model 150 for classification. For each document, the student classification model 150 proposes one or more regions of interest associated with one or more prediction targets for the document (904). For example, referring back to FIG. 4, the document is provided to the visual based feature extractor 404 (906). At 908, the visual based feature extractor 404 generates a feature map including the visual features of the document (such as described above with reference to FIGS. 4 through 6). At 910, the RPN 406 proposes the one or more regions of interest in the document based on the feature map.

At 912, the multi-ROI alignment engine 408 performs a multi-ROI alignment on the one or more regions of interest in the document to attempt to align the one or more regions of interest with at least a portion of one or more prediction targets generated based on the key identifying terms identified by the teacher classification model for the document. Operation of the engine 408 is described above with reference to FIG. 4.

At 914, for each of the plurality of documents, the student classification model 150 compares the one or more proposed regions of interest (from the student classification model) to the one or more prediction targets to generate an overall loss associated with a difference between the one or more proposed regions of interest and the one or more prediction targets. As noted above, the overall loss may be a multi-class combined loss associated with a loss from a bounding box layer, a loss from a mask layer, and a classification loss associated with a whole page classification layer. In some implementations of comparing the one or more proposed regions of interest to the one or more prediction targets for a document, referring back to FIG. 4, the bounding box layer 412 compares the one or more proposed regions of interest to one or more bounding boxes in the document as generated based on locating the key identifying terms identified by the teacher classification model to generate a bounding box layer loss. Comparing the one or more proposed regions of interest to the one or more prediction targets may also include comparing pixel values of pixels in the document as identified by a proposed mask (that is generated by the student classification model) to pixel values of pixels in the document as identified by a reference mask (that is generated by locating the key identifying terms identified by the teacher classification model) to generate a mask layer loss. For example, the proposed mask is generated by the student classification model to include the proposed regions of interest, and the reference mask corresponds to the location of the important terms to include the one or more bounding boxes. As noted above, the overall loss is a multi-task combined loss based on the bounding box layer loss, the mask layer loss, and a classification layer loss associated with a difference between classifications of the plurality of documents by the student classification model and the ground truths of the plurality of documents.

As noted above, training the student classification model is multi-task training for the student classification model based on at least two tasks: (i) the generation of bounding boxes, masks, or other ROI based objects for a document and (ii) classification of the entire document into a document type. As such, in addition to generating a mask layer loss and a bounding box layer loss contributing to an overall loss, a document type classification loss may also be generated based on a difference between the classifications by the student classification model (such as by the whole page classification layer 410 or 510 or the document type classifier 616) and labels indicating the ground truth classifications of the documents (such as based on previous manual classification of the documents). For example, at 916, the student classification model classifies each document into a document type based on the feature map. As noted above, classification into a document type may be performed by the whole page classification layer 410 or 510 or the document type classifier 616.

At 918, the student classification model compares its classification for a document to a label associated with the document. As noted above, a label may indicate the correct classification for the document. Also as noted above, the classification may be provided by a previous manual review of the document. Alternatively, if the same document is classified by the teacher classification model before being classified by the student classification model, the label may be associated with the classification by the teacher classification model. However, the labels are typically provided via a manual review. The difference between the labels and the classifications by the student classification model across all of the documents may be considered a classification loss. The classification loss is included or otherwise impacts the overall loss via any suitable expression of the overall loss.

At 920, the student classification model is adjusted to reduce the overall loss. For example, referring back to FIG. 4, one or more of the extractor 404, RPN 406, engine 408, layer 410, layer 412, or layer 414 may be adjusted to attempt to reduce the overall loss during training of the student classification model 400. To note, once training of the student classification model is complete (e.g., the components are to not be further adjusted to attempt to reduce the overall loss), in some implementations, the bounding box layer and the mask layer (or any other components whose outputs are not used by the whole page classification layer in classifying a document) may be removed from the student classification model. Removal of the components may be as described above with reference to FIGS. 4-6.

As described above, a visual based classification model is trained to be influenced by visual prediction targets corresponding to important texts in order to increase the accuracy of classifying a document. In particular, a text based classification model generates the key identifying terms associated with each potential document type, with training data based on the key identifying terms being generated (such as bounding boxes including the key identifying terms and masks based on the bounding boxes). The training data, which is based on the key identifying terms, is used to train the visual based classification model in order for the visual based classification model to identify and classify based on visual features associated with specific terms. In this manner, the accuracy of the visual based classification model is increased while the speed of the visual based classification model is still realized, thus improving the quality of document classifications.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for classifying documents, comprising:
receiving one or more documents to be classified based on one or more visual features;
providing the one or more documents to a student classification model, wherein the student classification model is a visual-based classification model; and
classifying, by the student classification model, the one or more documents into one or more document types based on the one or more visual features, wherein:
the one or more visual features are to be used by the student classification model to classify the one or more documents into the one or more document types;
the one or more visual features are generated by the student classification model that is trained based on important text identified by a teacher classification model for the one or more document types from a plurality of documents, wherein:
the important text identified by the teacher classification model includes, for each of the one or more document types, key identifying terms for the document type;
the key identifying terms for each document type correspond to prediction targets for the document type; and
training data to train the student classification model includes, for each document type, pairings of the prediction targets and the document type; and
the teacher classification model is a text-based classification model.

2. The method of claim 1, wherein identifying the key identifying terms for each document type by the teacher classification model includes:
for each of the plurality of documents classified into the document type, receiving a plurality of terms included in the document, wherein the plurality of terms are based on optical character recognition (OCR) performed on the document;
for each of the plurality of terms, generating a statistical measurement associated with an occurrence of the term for the document type; and
identifying one or more terms of the plurality of terms as the key identifying terms for the document type based on the statistical measurements, wherein identifying the one or more terms of the plurality of terms as the key identifying terms for the document type includes:
generating a relative importance measurement for each of the plurality of terms based on the statistical measurements, wherein the relative importance measurement indicates an influence of the term with reference to other terms in the plurality of terms in a decision boundary used by the teacher classification model;
ranking the plurality of terms based on the relative importance measurement; and
identifying the key identifying terms as a top number of terms for the document type based on the ranking.

3. The method of claim 2, wherein the plurality of terms includes one or more of:
one or more tokens; or
one or more bigrams.

4. The method of claim 2, wherein the one or more visual features generated by the student classification model for the one or more documents are based on training of the student classification model using the training data generated based on the key identifying terms identified by the teacher classification model, wherein the training data includes one or more prediction targets for a document type in a set of documents generated by locating the key identifying terms for the document type identified by the teacher classification model.

5. The method of claim 4, wherein training the student classification model includes:
providing the set of documents to the student classification model for classification;
for each document of the set of documents provided to the student classification model:
proposing, by the student classification model, one or more regions of interest associated with the one or more prediction targets for the document type that are generated based on the key identifying terms for the document type identified by the teacher classification model; and
comparing the one or more proposed regions of interest to the one or more prediction targets to generate an overall loss associated with a difference between the one or more proposed regions of interest and the one or more prediction targets; and
adjusting the student classification model to reduce the overall loss.

6. The method of claim 5, wherein proposing the one or more regions of interest for a document includes:
providing the document to a visual based feature extractor;
generating, by the visual based feature extractor, a feature map including the visual features of the document; and
proposing, by a region proposal network (RPN), the one or more regions of interest in the document based on the feature map, wherein a multiple region of interest (multi-ROI) alignment is performed on the one or more regions of interest in the document to attempt to align the one or more regions of interest with at least a portion of one or more prediction targets generated for the document.

7. The method of claim 6, wherein comparing the one or more proposed regions of interest to the one or more prediction targets for a document includes:

comparing, by a bounding box layer of the student classification model, the one or more proposed regions of interest to one or more bounding boxes in the document corresponding to the key identifying terms to generate a bounding box layer loss, wherein the one or more prediction targets include the one or more bounding boxes; and comparing pixel values of pixels in the document as identified by a proposed mask to pixel values of pixels in the document as identified by a reference mask to generate a mask layer loss, wherein:

the proposed mask is generated by the student classification model to include the proposed regions of interest;

the reference mask is generated by locating the key identifying terms identified by the teacher classification model to include the one or more bounding boxes, wherein the one or more prediction targets include the mask; and the overall loss is a multi-task combined loss based on the bounding box layer loss, the mask layer loss, and a classification layer loss associated with a difference between classifications of the set of documents by the student classification model and classification ground truths from the plurality of documents.

8. The method of claim 7, wherein the bounding box layer and the mask layer are removed from the student classification model once the training of the student classification model is complete.

9. A system for classifying documents, comprising:

one or more processors; and a memory storing instructions that, when executed by the one or more processors, causes the system to perform operations comprising:

receiving one or more documents to be classified based on one or more visual features;

providing the one or more documents to a student classification model, wherein the student classification model is a visual-based classification model; and classifying, by the student classification model, the one or more documents into one or more document types based on the one or more visual features, wherein:

the one or more visual features are to be used by the student classification model to classify the one or more documents into the one or more document types;

the one or more visual features are generated by the student classification model that is trained based on important text identified by a teacher classification model for the one or more document types from a plurality of documents wherein:

the important text identified by the teacher classification model includes, for each of the one or more document types, key identifying terms for the document type;

the key identifying terms for each document type correspond to prediction targets for the document type; and training data to train the student classification model includes, for each document type, pairings of the prediction targets and the document type; and the teacher classification model is a text-based classification model.

10. The system of claim 9, wherein identifying key identifying terms for each document type by the teacher classification model includes:

for each of the plurality of documents classified into the document type, receiving a plurality of terms included in the document, wherein the plurality of terms are based on optical character recognition (OCR) performed on the document;

for each of the plurality of terms, generating a statistical measurement associated with an occurrence of the term for the document type; and identifying one or more terms of the plurality of terms as key identifying terms for the document type based on the statistical measurements, wherein identifying the one or more terms of the plurality of terms as the key identifying terms for the document type includes:

generating a relative importance measurement for each of the plurality of terms based on the statistical measurements, wherein the relative importance measurement indicates the influence of the term with reference to other terms in the plurality of terms in a decision boundary used by the teacher classification model;

ranking the plurality of terms based on the relative importance measurement; and identifying the key identifying terms as a top number of terms based on the ranking.

11. The system of claim 10, wherein the plurality of terms includes one or more of:

one or more tokens; or one or more bigrams.

12. The system of claim 10, wherein the one or more visual features generated by the student classification model for the one or more documents are based on training of the student classification model using the training data generated based on the key identifying terms identified by the teacher classification model, wherein the training data includes one or more prediction targets for a document type in the plurality of documents generated by locating the key identifying terms for the document type identified the teacher classification model.

13. The system of claim 12, wherein training the student classification model includes:

providing a set of documents to the student classification model for classification;

for each document of the set of documents provided to the student classification model:

proposing, by the student classification model, one or more regions of interest associated with the one or more prediction targets for the document type that are generated based on the key identifying terms for the document type identified by the teacher classification model; and comparing the one or more proposed regions of interest to the one or more prediction targets to generate an overall loss associated with a difference between the one or more proposed regions of interest and the one or more prediction targets; and adjusting the student classification model to reduce the overall loss.

14. The system of claim 13, wherein proposing the one or more regions of interest for a document includes:

providing the document to a visual based feature extractor;

generating, by the visual based feature extractor, a feature map including the visual features of the document; and proposing, by a region proposal network (RPN), the one or more regions of interest in the document based on the feature map, wherein a multiple region of interest (multi-ROI) alignment is performed on the one or more regions of interest in the document to attempt to align the one or more regions of interest with at least a portion of one or more prediction targets generated for the document.

15. The system of claim 14, wherein comparing the one or more proposed regions of interest to the one or more prediction targets for a document includes:

comparing, by a bounding box layer of the student classification model, the one or more proposed regions of interest to one or more bounding boxes in the document corresponding to the key identifying terms to generate a bounding box layer loss, wherein the one or more prediction targets include the one or more bounding boxes; and comparing pixel values of pixels in the document as identified by a proposed mask to pixel values of pixels in the document as identified by a reference mask to generate a mask layer loss, wherein:
the proposed mask is generated by the student classification model to include the proposed regions of interest;
the reference mask is generated by locating the key identifying terms identified by the teacher classification model to include the one or more bounding boxes, wherein the one or more prediction targets include the mask; and
the overall loss is a multi-task combined loss based on the bounding box layer loss, the mask layer loss, and a classification layer loss associated with a difference between classifications of the set of documents by the student classification model and classification ground truths from the plurality of documents.

16. The system of claim 15, wherein the bounding box layer and the mask layer are removed from the student classification model once the training of the student classification model is complete.

17. A computer-implemented method for generating training data to train a visual-based classification model based on text based features, the method comprising:

receiving a plurality of documents to be classified by a teacher classification model into one or more document types, wherein the teacher classification model is a text-based classification model;

for each of the plurality of documents, receiving a plurality of terms included in the document, wherein the plurality of terms are based on optical character recognition (OCR) performed on the document;

for each of the plurality of terms, generating a statistical measurement associated with an occurrence of the term for the document type; and identifying, by the teacher classification model, one or more terms of the plurality of terms as key identifying terms for the document type based on the statistical measurements, wherein identifying the one or more terms of the plurality of terms as key identifying terms for the document type includes:

generating a relative importance measurement for each of the plurality of terms based on the statistical measurements, wherein the relative importance measurement indicates an influence of the term with reference to other terms in the plurality of terms in a decision boundary used by the teacher classification model;

ranking the plurality of terms based on the relative importance measurement; and identifying the key identifying terms for the document type based on the ranking, wherein:
the key identifying terms are to be used to generate training data to train a visual-based classification model based on text based features;
the key identifying terms for each document type correspond to prediction targets for the document type; and
the training data to train the visual-based classification model includes, for each document type, pairings of the prediction targets and the document type.

18. The method of claim 17, wherein the training data includes one or more prediction targets generated for a document based on the key identifying terms.

19. The method of claim 18, wherein generating a statistical measurement for a term includes performing a term frequency-inverse document frequency (TF-IDF) algorithm on the terms in the plurality of documents to output a plurality of statistical measurements indicating the relative occurrence of a term in documents classified to a document type, wherein the relative importance measurement for the term for the document type is based on the relative occurrence of the term in the documents classified to the document type.

20. The method of claim 18, wherein one or more prediction targets in a document include one or more of:
one or more bounding boxes in the document, wherein each of the one or more bounding boxes is associated with a location of a key identifying term in the document; or
a mask generated to include the one or more bounding boxes in the document.

* * * * *